(12) United States Patent  (10) Patent No.: US 8,724,918 B2
Abraham  (45) Date of Patent: May 13, 2014

(54) METHOD AND SYSTEM FOR ENHANCING AN IMAGE

(75) Inventor: Michael Abraham, Rishon Le Zion (IL)

(73) Assignee: Elta Systems Ltd., Ashdod (IL)

( * ) Notice: Subject to any disclaimer, the term of this patent is extended or adjusted under 35 U.S.C. 154(b) by 38 days.

(21) Appl. No.: 13/515,617

(22) PCT Filed: Dec. 16, 2010

(86) PCT No.: PCT/IL2010/001071
§ 371 (c)(1),
(2), (4) Date: Jun. 13, 2012

(87) PCT Pub. No.: WO2011/073990
PCT Pub. Date: Jun. 23, 2011

(65) Prior Publication Data
US 2013/0064467 A1    Mar. 14, 2013

(30) Foreign Application Priority Data

Dec. 17, 2009    (IL) .......................................... 202788

(51) Int. Cl.
*G06F 9/40*    (2006.01)
(52) U.S. Cl.
USPC .......................................... 382/254; 382/173
(58) Field of Classification Search
USPC ......... 382/128, 130, 131, 132, 118, 173, 181, 382/254, 300; 715/243; 348/606; 600/407; 324/307, 309, 318
See application file for complete search history.

(56) References Cited

U.S. PATENT DOCUMENTS

| 4,636,850 A | 1/1987 | Stewart |
| 4,975,704 A | 12/1990 | Gabriel et al. |
| 6,529,575 B1 | 3/2003 | Hsieh |

(Continued)

FOREIGN PATENT DOCUMENTS

WO    WO 2006/064261 A1    6/2006

OTHER PUBLICATIONS

Zitova et al., "Image registration methods: a survey," *Image and Vision Computing*, vol. 21, pp. 977-1000, 2003.

(Continued)

*Primary Examiner* — Anh Do
(74) *Attorney, Agent, or Firm* — Oliff PLC

(57) ABSTRACT

There are provided a method for computerized generation of an enhanced image based on a plurality of acquired images (e.g. SAR images) and system thereof. The method comprises: (a) receiving a plurality of acquired images, each comprising a common area of interest; (b) receiving processing parameters; (c) grouping said plurality of acquired images into one or more groups; (d) processing the images within said one or more groups, wherein said processing comprises: i) for each given pixel within the common area of interest, calculating a likelihood of discrepancy between respective pixels of the images of said one or more groups, thus giving rise to likelihood of discrepancy values characterizing said given pixel; ii) generating a "likelihood of discrepancy matrix" comprising the likelihood of discrepancy values and characterizing the likelihood of discrepancy for each pixel within the common area of interest; iii) for each of said one or more groups, generating an enhanced image while utilizing said likelihood of discrepancy matrix.

75 Claims, 10 Drawing Sheets

(56) References Cited

U.S. PATENT DOCUMENTS

| | | | |
|---|---|---|---|
| 6,650,273 | B1 | 11/2003 | Obenshain |
| 7,064,779 | B1 | 6/2006 | Pine |
| 7,065,235 | B2 * | 6/2006 | Dewaele .............. 382/132 |
| 7,155,031 | B2 | 12/2006 | Yanagisawa et al. |
| 7,295,691 | B2 * | 11/2007 | Uppaluri et al. .............. 382/130 |
| 7,466,848 | B2 * | 12/2008 | Metaxas et al. .............. 382/128 |
| 7,636,485 | B2 * | 12/2009 | Simon et al. .............. 382/254 |
| 7,760,956 | B2 * | 7/2010 | Lin et al. .............. 382/254 |
| 2004/0022438 | A1 | 2/2004 | Hibbard |
| 2004/0156561 | A1 | 8/2004 | Yu-Chuan et al. |
| 2005/0232514 | A1 | 10/2005 | Chen |
| 2006/0228040 | A1 | 10/2006 | Simon et al. |
| 2006/0239537 | A1 | 10/2006 | Shragai et al. |
| 2006/0239550 | A1 | 10/2006 | Pulsifer |
| 2007/0162193 | A1 | 7/2007 | Garceau et al. |

OTHER PUBLICATIONS

Wang et al., "Image Quality Assessment: From Error Visibility to Structural Similarity," *IEEE Transactions on Image Processing*, vol. 13, No. 4, pp. 600-612, 2004.

Moreira, "Improved Multilook Techniques Applied to SAR and SCANSAR Imagery," *IEEE Transactions on Geoscience and Remote Sensing*, vol. 29, No. 4, pp. 529-534, 1991.

Schneider et al., "Entropy Among a Sequency of SAR Images for Change Detection," *Proceedings of the 2003 IEEE International Symposium on Geoscience and Remote Sensing*, Jul. 21-25, 2003.

Shapiro et al., "Filtering and Enhancing Images," *Computer Vision*, chapter 5, Mar. 2000.

"Sobel operator," *Wikipedia*, http://en.wikipedia.org/wiki/Sobel_operator, pp. 1-4, accessed Feb. 4, 2008.

"Tourist Remover," *Snapmania*, http://web.archive.org/web/20080515170749/http://www.snapmania.com/info/en/trm/, accessed Jun. 3, 2008.

"Using Multiple Exposures in Photography," *Ed Halley's GIMP Tutorial on Using Multiple Exposures*, http://webarchive.org/web/20080320234804/http://www.halley.cc/photo/multexp/gimp.multexp.2.html, accessed Jan. 5, 2013.

\* cited by examiner

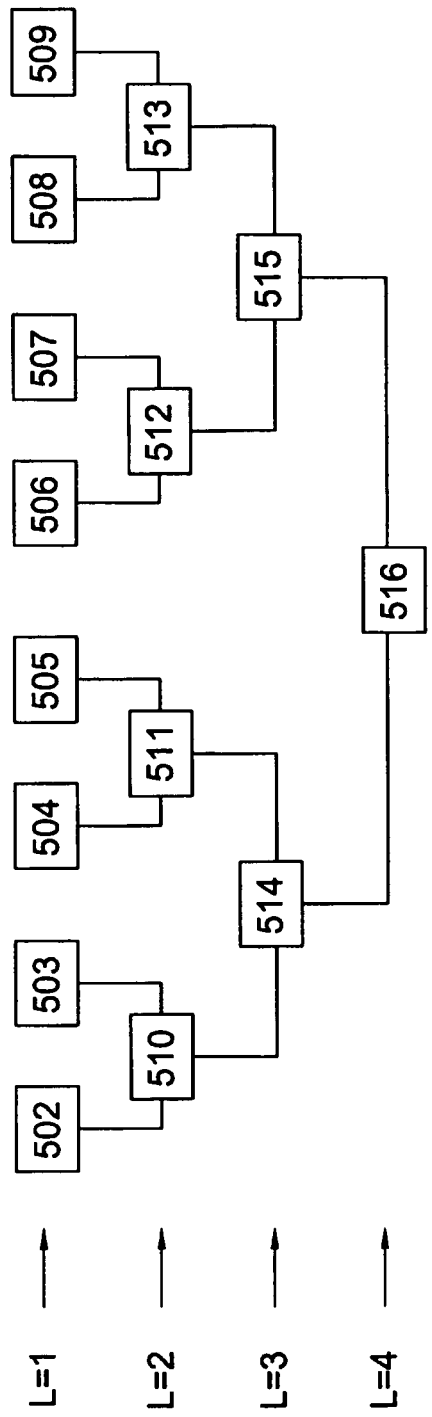
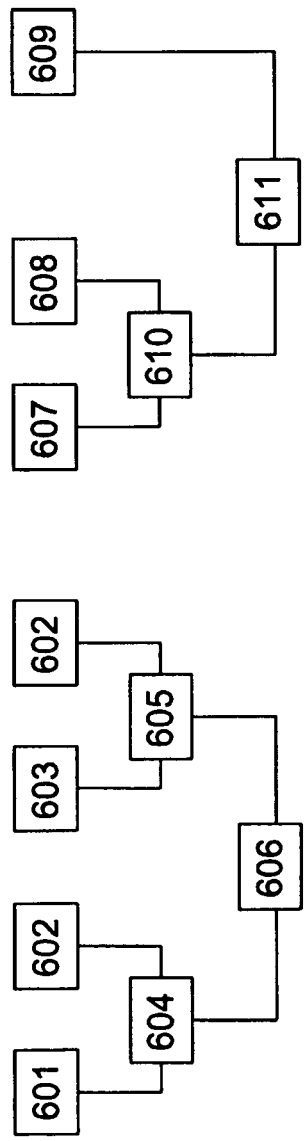
Figure 5
Figure 6A
Figure 6B

METHOD AND SYSTEM FOR ENHANCING AN IMAGE

CROSS-REFERENCES TO RELATED APPLICATIONS

This application relates to and claims priority from Israel Patent Application No. IL202788 filed on Dec. 17, 2009 and incorporated herein by reference in its entirety.

FIELD OF THE INVENTION

This invention relates to image processing. More specifically, it relates to generating enhanced imagery based on a plurality of acquired images.

BACKGROUND OF THE INVENTION

It is presently common to use images of a scene for monitoring thereof, including, inter alia, usage of SAR (Synthetic Aperture Radar) images for that purpose. Computerized processing of such images involves image processing.

Those versed in the art of image processing are familiar with the requirement to register two or more images of a scene. There are known techniques for image registration. See, for example, Barbara Zitová and Jan Flusser's "*Image registration methods: a survey*" (Image and Vision Computing 21, 2003, pages 977-1,000), presenting several such methods.

However, it sometimes happens that one or more images suffer from occlusion, poor contrast etc., which disturb interpretation or processing of the data included therein. Partial and basic handling of such cases is presently done in the art.

Quality assessment of images is dealt with, for example, in the article "*Image Quality Assessment: from Error Visibility to Structural Similarity*" (IEE transactions on image processing, Vol 13, No 4, April 2004), by Wang et al., who teach a method for quality assessment of images based on the degradation of structural information.

Another example is, Alberto Moreira's "*Improved Multilook Techniques Applied to SAR and SCANSAR Imagery*" (IEEE Transactions on Geoscience and Remote Sensing, Vol. 29, No 4, July 1991), suggesting techniques for multilook processing. These techniques are based on the formation of looks with different bandwidths. The final image is formed by giving each look a proper size and weighting and by adding them incoherently.

In chapter 5 of their book "Computer Vision", Linda Shapiro and George Stockman teach a method for filtering and enhancing images.

Image processing and enhancement of images require different techniques, sometimes taken from other fields of technology. For example, in the field of decision making full reinforcement operators and reinforcement learning are known algorithms that combine fuzzy logic and reinforcement learning.

SUMMARY OF THE INVENTION

In accordance with certain aspects of presently disclosed subject matter, there is provided a method for computerized generation of an enhanced image based on a plurality of acquired images. By way of non-limiting example, the images can be acquired with the help of Synthetic Aperture Radar (SAR). The plurality of acquired images can originate from one or more sources (e.g. the images can be acquired by one or more SAR systems during one or more periods of time, etc.). The method comprises: (a) receiving a plurality of acquired images, each comprising a common area of interest; (b) receiving processing parameters; (c) grouping said plurality of acquired images into one or more groups; (d) processing the images within said one or more groups, wherein said processing comprises: i) for each given pixel within the common area of interest, calculating a likelihood of discrepancy between respective pixels of the images of said one or more groups, thus giving rise to likelihood of discrepancy values characterizing said given pixel; ii) generating a "likelihood of discrepancy matrix" comprising the likelihood of discrepancy values and characterizing the likelihood of discrepancy for each pixel within the common area of interest; iii) for each of said one or more groups, generating an enhanced image while utilizing said likelihood of discrepancy matrix. Generating an enhanced image can comprise improving the contrast of at least one of said plurality of acquired images, reducing noise in at least one of said plurality of acquired images, and/or improving other values characterizing quality of respective image(s) and/or of information extracted thereof.

Each pixel in the enhanced image can be calculated as a weighted combination between respective pixels of the images in the group, wherein the weights of the respective pixels are defined by their respective values within the likelihood of discrepancy matrix.

In case when more than one enhanced image is generated the method can further comprise: (a) grouping said enhanced images into one or more groups; (b) processing the images within said one or more groups, wherein said processing can comprise: i) for each given pixel within the common area of interest, calculating a likelihood of discrepancy between respective pixels of the images of said one or more groups, thus giving rise to likelihood of discrepancy values characterizing said given pixel; ii) generating a "likelihood of discrepancy matrix" comprising the likelihood of to discrepancy values, characterizing the likelihood of discrepancy for each pixel within the common area of interest; iii) for each of said one or more groups, generating an enhanced image while utilizing said likelihood of discrepancy matrix; (c) repeating steps (a) and (b) until a single enhanced image is created.

The method can further comprise selecting an image to be enhanced, wherein the pixel corresponding to the selected image is provided with additional weight in the weighted combination proportional to the likelihood of discrepancy value.

In accordance with other aspects of presently disclosed subject matter, there is provided a system capable of generating an enhanced image based on a plurality of acquired images. By way of non-limiting example, the images can be acquired with the help of Synthetic Aperture Radar (SAR). The plurality of acquired images can originate from one or more sources (e.g. the images can be acquired by one or more SAR systems during one or more periods of time, etc.). The system comprises a processor operatively connected to an image input block and a processing parameters input block; wherein the image input block is configured to receive a plurality of acquired images, each comprising a common area of interest; the processing parameter input block is configured to receive processing parameters; and the processor is configured to group said plurality of acquired images into one or more groups and process the images within said one or more groups, including at least the following: i) for each given pixel within the common area of interest, calculate a likelihood of discrepancy between respective pixels of the images of said one or more groups, thus giving rise to likelihood of discrepancy values characterizing said given pixel; ii) generate a "likelihood of discrepancy matrix" comprising the likelihood of discrepancy values and characterizing the likelihood of discrepancy for each pixel within the common area of interest; iii) for each of said one or more groups, generate an enhanced image while utilizing said likelihood of discrepancy matrix. The system can further comprise a display wherein said processor can be further configured to display said enhanced image on said display.

In case when more than one enhanced image is generated, the processor can be further configured to perform at least the following: (a) group said enhanced images into one or more groups; (b) process the images within said one or more groups, including at least the following: i) for each given pixel within the common area of interest, calculate a likelihood of discrepancy between respective pixels of the images of said one or more groups, thus giving rise to likelihood of discrepancy values characterizing said given pixel; ii) generate a "likelihood of discrepancy matrix" comprising the likelihood of discrepancy values, characterizing the likelihood of discrepancy for each pixel within the common area of interest; iii) for each of said one or more groups, generate an enhanced image while utilizing said likelihood of discrepancy matrix; (c) repeat steps (a) and (b) until a single enhanced image is created.

In accordance with further aspects of disclosed subject matter with regard to provided system and/or method, in case any of the groups consists more than two images, generating a "likelihood of discrepancy matrix" for that group can comprise: (a) generating a likelihood of discrepancy matrix for at least one possible couple within the group; (b) calculating an average likelihood of discrepancy matrix corresponding to all likelihood of discrepancy matrices generated for said at least one possible couple in the group.

Each pixel in the enhanced image can be calculated as a weighted combination between respective pixels of the images in the group, wherein the weights of the respective pixels are defined by their respective values within the likelihood of discrepancy matrix.

In accordance with further aspects of disclosed subject matter with regard to provided system and/or method, the processing parameters can include at least one of the following: (a) an indication of a selected image to be enhanced; (b) a target size parameter, representing the size of an object of interest; (c) a pixel size parameter, representing the size of an area covered by a single pixel in an image.

In accordance with further aspects of disclosed subject matter with regard to provided system and/or method, generating a likelihood of discrepancy matrix can include: (a) computing one or more characteristics for each of said respective pixels of the images of said one or more groups, thus giving rise to computed characteristics; and (b) processing said computed characteristics for obtaining normalized differences values amongst each of said respective pixels of the images of said one or more groups, constituting the likelihood of discrepancy matrix respective of the one or more to characteristics of each of said respective pixels of the images of said one or more groups.

The characteristics include at least one of the following: (a) local targetness calculations; (b) local texture calculation; (c) local entropy calculations.

Local texture calculation can be computed in accordance with $$I_g = \sqrt{f_x^2 + f_y^2}$$

$$TEM(x, y) = \sqrt{\frac{2}{w^2} \sum_{i=-w/2}^{w/2} \sum_{j=-w/2}^{w/2} I_g^2(x+i, y+j)}$$

wherein: $f_x$ and $f_y$ are the output of a Sobel operator applied to pixels in each image; x and y stand for the central pixel of a local texture sliding window; i and j identify pixel displacement around the local texture sliding window's central pixel x, y; w is the local texture sliding window's width and height.

Obtaining normalized differences can be done in accordance with $$R = 1 - \frac{2 \times TEM_a \times TEM_b}{(TEM_{aa} + TEM_{bb})}; 0 \leq R < 1$$

wherein: $TEM_a$ is the local texture obtained for $Image_a$ amongst respective group; $TEM_b$ is the local texture obtained for $Image_b$ amongst said respective group; $TEM_{aa}$ is $(TEM_a)^2$; and $TEM_{bb}$ is $(TEM_b)^2$.

Local targetness calculation can be computed in accordance with $$T = \frac{\prod_{j=1}^{n} G_j}{\prod_{j=1}^{n} G_j + \prod_{j=1}^{n} \overline{G}_j};$$

wherein: n is the number of pixels forming a targetness sliding window; $G_j$ is the G value computed for a pixel j in accordance with:

$$G = 1 - \exp(-f/k \times \mu_{loc})$$

wherein:
f represents reflection of a pixel; $\mu_{loc}$=mean(f), the mean reflection of pixels in an extended neighborhood of the pixel; k is a constant.

Obtaining normalized differences can be done in accordance with $$T_{diff} = T_a \times (1-T_b) + T_b \times (1-T_a)$$

wherein $T_a$ and $T_b$ stand for targetness (T) of corresponding pixels in $Image_a$ and $Image_b$, respectively.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 5 is an exemplary diagram illustrating integration while creating an enhanced image, in accordance with an embodiment of the invention;

FIG. 6A is an exemplary diagram illustrating integration while creating an enhanced image, in accordance with one embodiment of the invention;

FIG. 6B is an exemplary diagram illustrating integration while creating an enhanced image, in accordance with another embodiment of the invention;

DETAILED DESCRIPTION OF EMBODIMENTS

Figure 1:
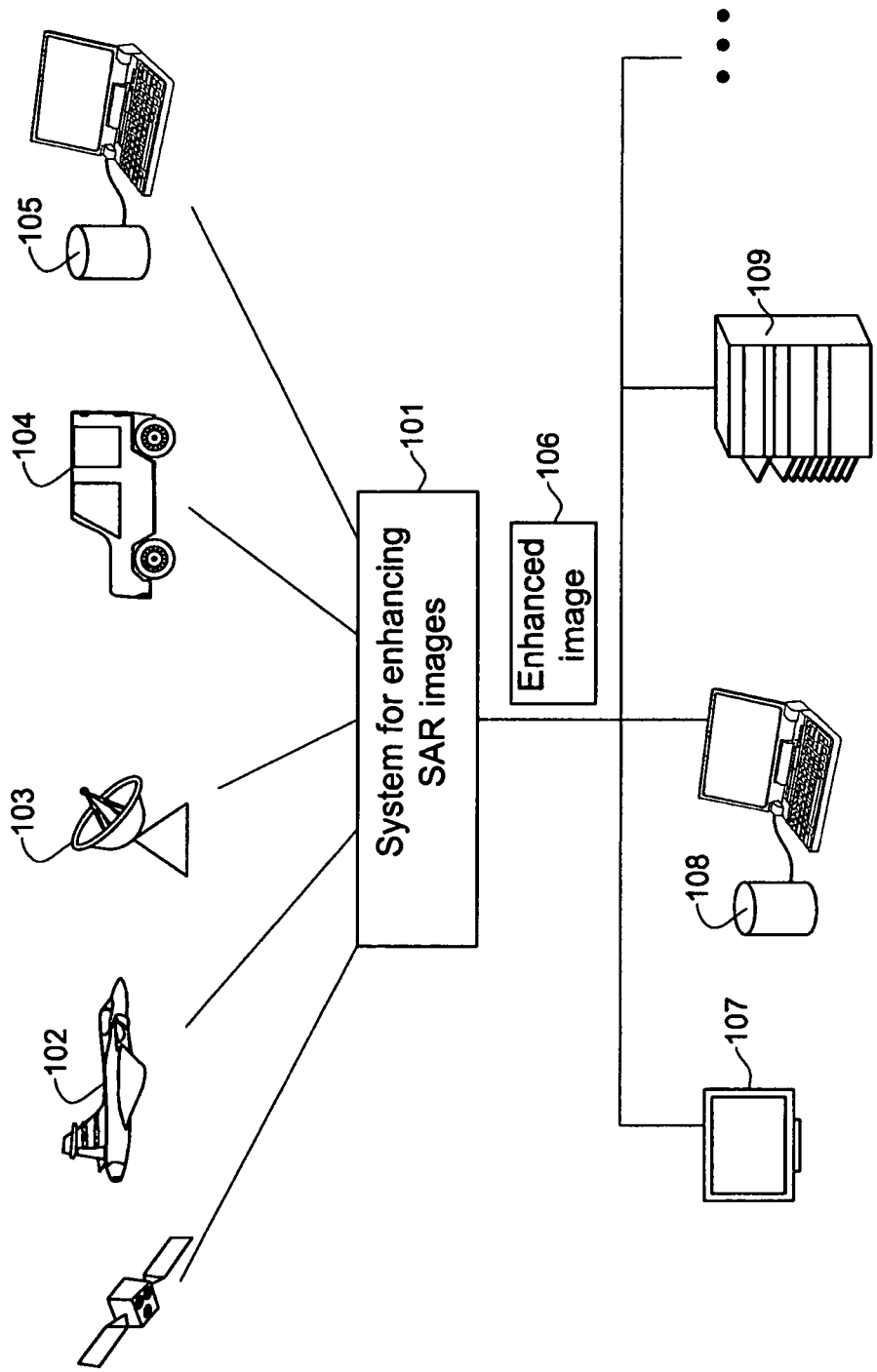
FIG. 1 is a schematic representation of a system for processing images in accordance with one embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "receiving", "selecting", "grouping", "performing", "calculating", "generating" "processing", "improving", "assessing", "computing", "obtaining" or the like, refer to the action and/or processes of a computer that manipulate and/or transform data into other data, said data represented as physical, such as electronic, quantities and/or data representing the physical objects. The term "computer" should be expansively construed to cover any kind of electronic system with data processing capabilities.

The operations in accordance with the teachings herein may be performed by a computer specially constructed for the desired purposes or by a general-purpose computer specially configured for the desired purpose by a computer program stored in a computer readable storage medium.

In the following description components that are common to more than one figure will be referenced by the same reference numerals.

In addition, unless specifically noted, embodiments described or referenced in the present description can be additional and/or alternative to any other embodiment described hereinafter.

For purpose of illustration only, the following description is made with respect to SAR (Synthetic Aperture Radar) images. Those skilled in the art will readily appreciate that the teachings of the present invention are applicable in a similar manner to other digital image types as, by way of non-limiting example, electro-optical images, ultra-sound images, x-ray images, infra-red images, etc.

FIG. 1 is a schematic representation of a system 101 for processing SAR (Synthetic Aperture Radar) images. In accordance with certain embodiments of the invention, the system may provide enhanced images based on a plurality of acquired images. Alternatively or additionally, the system 101 may be configured for detecting discrepancies amongst SAR images. In the figure, the system 101 obtains SAR images as input. It may obtain the input from one or more sources such as an airborne radar 102 transmitting SAR images to the system 101, a spaceborne radar 103 transmitting SAR images thereto, a ground positioned radar 104 transmitting SAR images to the system (e.g., a radar carried by a vehicle), an archive or a storage device 105 in which SAR to images are stored, etc. The sources mentioned herewith are non-limiting examples and system 101 may obtain images from any other appropriate source. Optionally, the system may obtain input from more than one source at a time. For example, it may obtain one SAR image from an airborne radar 102, one image from a ground positioned radar 104, and additional images from archive 105. SAR images obtained as input, regardless of their respective source, are referred to hereinafter as "acquired SAR images" or shortly, "acquired images".

The system 101 can further receive processing parameters as input. The processing parameters can include, inter alia:
- an indication of a selected image a user chose to enhance out of the plurality of acquired images;
- a parameter defining the target size, being the size of an object of interest. For example, a municipality can define the requirement to detect constructions whose size is 5 meters over 5 meters (i.e., 25 square meters) or less, i.e., the target's size is 5×5 meters;
- a parameter defining the pixel size, being the size of the area covered by a single pixel in the image. For example, if the pixel size is 1 meter, the area covered in a single pixel is 1×1 meter.

According to certain embodiments of the invention, the system 101 uses a plurality of acquired images, each comprising a common area of interest in order to generate one or more enhanced images 106. According to additional and/or alternative embodiments, the system 101 can detect discrepancies amongst a plurality of acquired images, each of the acquired images comprising a common area of interest.

The output of system 101 may be provided by any available and applicable means, such as displaying the output on a screen 107, storing it in a storage device and/or archive 108 (the archive can be identical or different than the archive 105), and/or printing it by the aid of a printer 109, etc.

Figure 2:
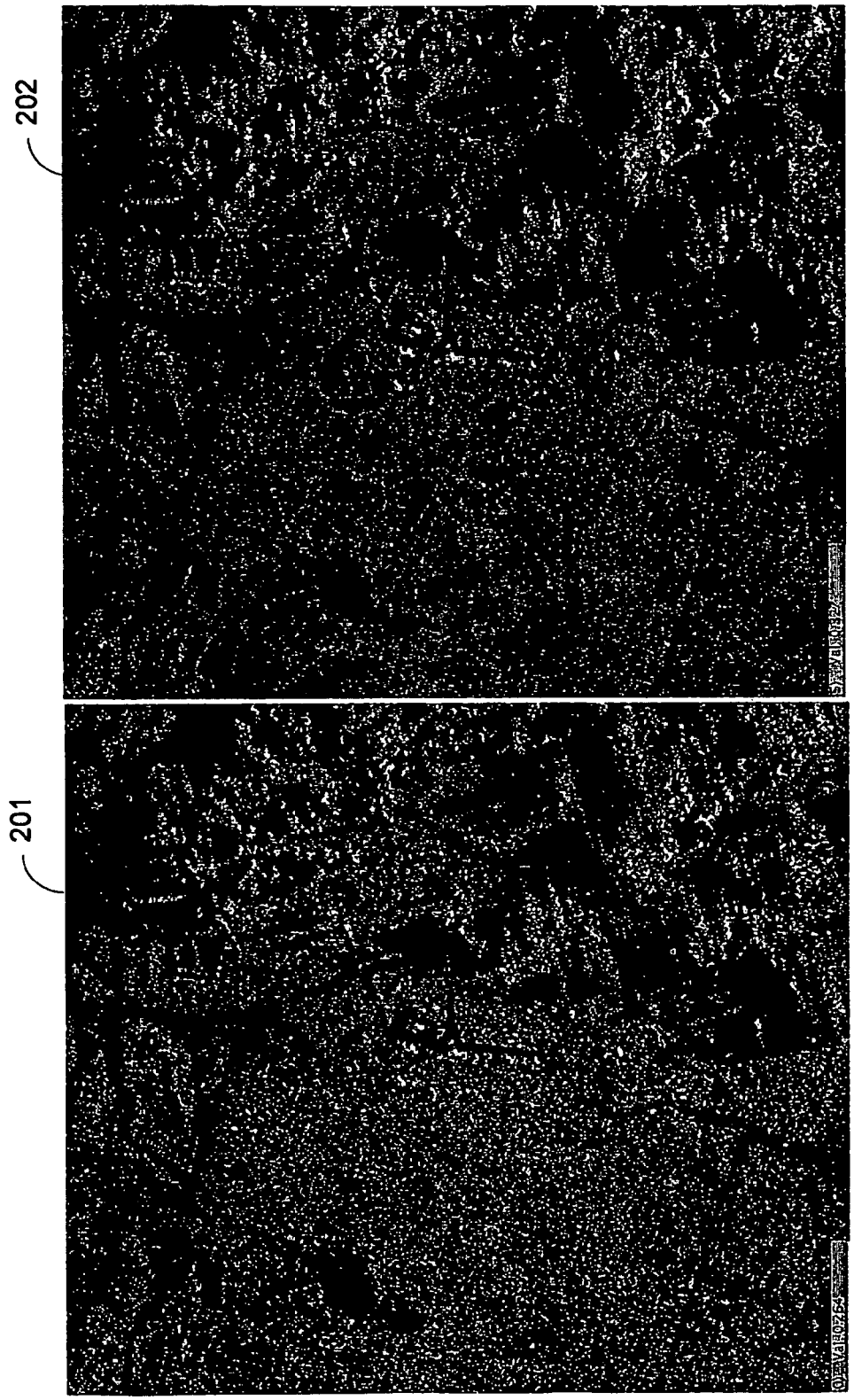
FIG. 2 is an example of a SAR image and a corresponding enhanced image achieved in accordance with an embodiment of the invention.

FIG. 2 is a non-limiting example of an acquired SAR image 201 and an enhanced image 202 which enhances image 201, the enhanced image 202 is achieved in accordance with an embodiment of the invention. It is appreciated that enhanced image 202 is clearer than image 201. It is noted that image 202 was achieved as result of a computation performed by system 101, hence it constitutes a "synthetic image", unlike image 201 which was acquired from any source. It is noted, though, that image 201, if obtained e.g. from an archive (such as archive 105), may be an image that was previously processed by the system. However, because the image is presently obtained as input and is used for enhancing another image or is subject for further enhancement, it is considered as an acquired image, while ignoring its history.

Figure 3:
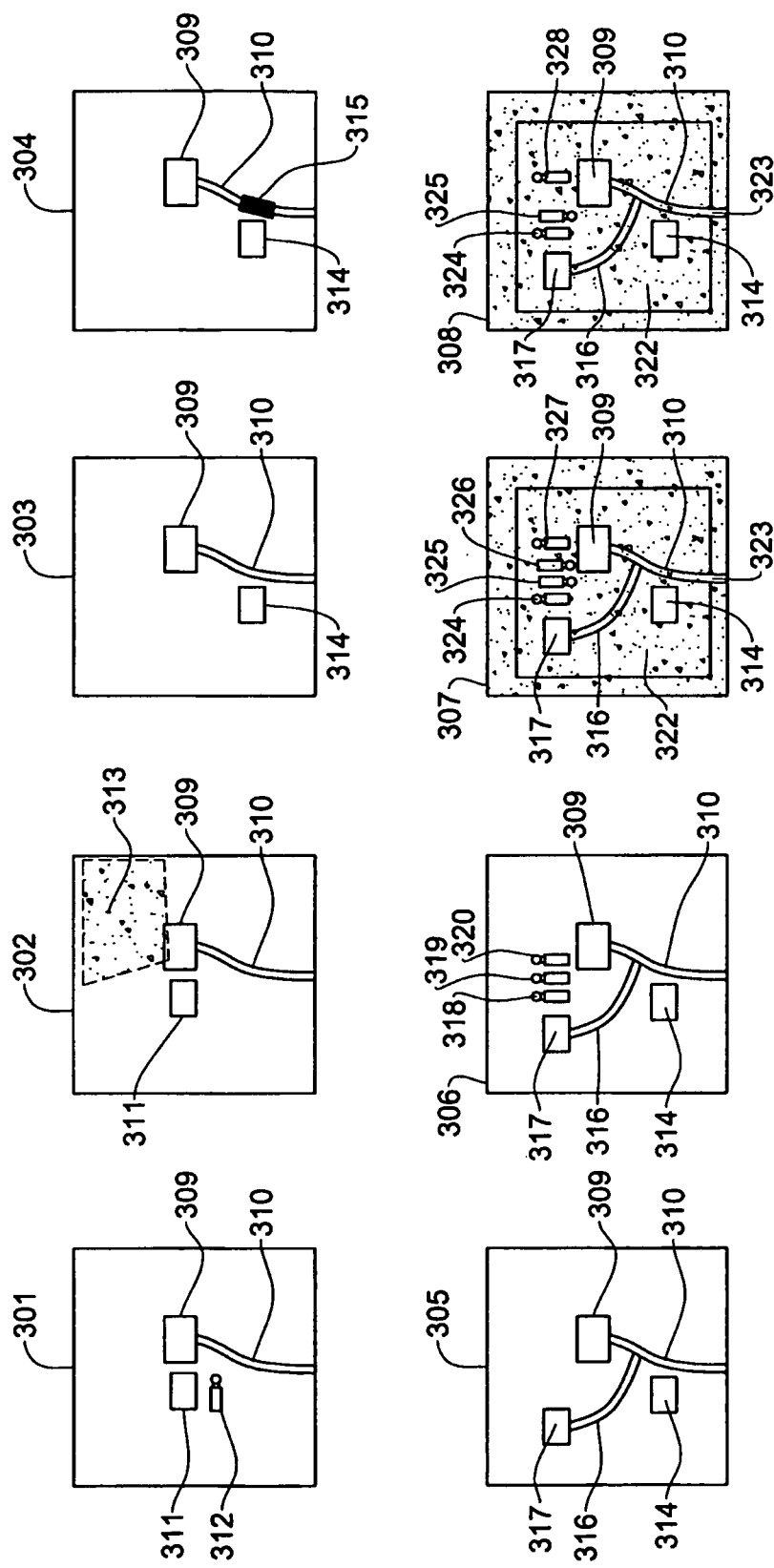
FIG. 3 is a schematic example illustrating several temporal images of a scene.

FIG. 3 is a non-limiting schematic example illustrating several temporal images of a scene. The images are denoted 301 to 308. The images were all taken from above, e.g., from a standing-off or standing-in airplane, during a leg. However, this is non-limiting. Moreover, the images in FIG. 3 were not necessarily acquired by the same platform. For example, one or more images in a series could have been acquired by an airplane, while one or more other images in the same series could have been acquired by a satellite, etc. Moreover, it is possible that none, one or more and even all the images are obtained directly from the radar, while it is also possible that none, one or more and even all the images are obtained from an archive where they are stored.

In the example, the images represent registered temporal images of the same scene. Image 301 was taken first. Then, after a certain period (which can be seconds, hours, days or even years) image 302 was taken, and then images 303, 304, ..., 308. Such temporal images constitute, hereinafter, a "series of temporal images", or shortly, a "series", and may also be referred to as a "sequence of temporal images", or shortly, as a "sequence". The term "frame" is sometimes used, hereinafter, in order to refer to an image in a series. Registration of the images in a series can be done in any appropriate method known per se.

It is noted that originally, a total overlapping between the acquired images is not mandatory, as long as they have an overlapping portion (including, for example, a common area of interest). Hence, it is possible that, e.g., image 301 was originally larger than the image illustrated in the figure, and so was image 302 (and the other images as well). However, the illustrated images represent only those overlapping portions, further to registration and resampling, performed by any appropriate method known per se. Hereinafter, the "series" includes only those portions of the images that are overlapping. Furthermore, the term "acquired image" further refers to the all or part of the overlapping portion (for example the common area of interest), after registration and resampling.

Image 301 illustrates a building 309 and a road 310 leading thereto. In addition, the image includes building 311, which is a neighbor of building 309, and a vehicle 312 (probably a truck) parking nearby. In image 302, the same buildings 309 and 311 as well as road 310 appear, however, the vehicle 312 is missing therefrom. In the image 302, building 309 is partially occluded (by environmental phenomena and/or an artifact), and therefore part thereof does not appear in the image. The occluded part 313 of the image is represented by a dotted region. Image 303 includes, in addition to building 309 and road 310, another building 314, while building 311 is missing (probably destroyed sometimes between the times when images 302 and 303 were taken). In image 304 there is a vehicle 315 (e.g., a truck), positioned on road 310 near building 314.

Image 305 shows that road 310 has now been forked into a new road 316, in the end of which there is a new building 317. In image 306 there are three vehicles, 318, 319 and 320 parking near building 317. In image 307 a fence 321 appears around the buildings, bordering area 322 and delimiting it as a camp. The entrance 323 to the camp is via road 310. Four vehicles, denoted 324, 325, 326 and 327 park now near building 317. In addition, image 307, like image 302, also suffers from occlusion, represented by the doted region, and hence it is unclear.

Image 308 was probably taken a short time after image 307. It is also occluded. In addition, three of the vehicles appearing in image 307 (these are vehicles 324, 325 and 327) still appear therein, but vehicle 326 was probably driven away and hence it is missing from the image.

According to certain embodiments of the invention, items appearing only in a subset of the images in a series are referred to as "objects" or "object items", while items that appear in all images of a series are referred to as "background" or "background items". In the example of the series of FIG. 3, building 309 and road 310 are part of the background, because they appear in every image being part of the series. However, buildings 311, 314 and 317, the vehicles appearing in some of the images (such as 312, 315, 318, 319, 320 and others), fence 321 etc. are objects. Furthermore, it is noted that hereinafter, the term "item" appearing alone (i.e., not as part of a phrase such as "object item" or "background item") is used for referring to any one of object items and background items. Hence, an item is anything that appears in one, two or any other subset of a series, including every image of the series.

In light of the occlusion that appears, for example, in image 308, it may be required to enhance the image, thus allowing the viewer to better distinguish the items included therein. For that purpose, the user can indicate that image 308 is to be enhanced. Returning to the example presented with reference to FIG. 2, wherein image 202 enhances acquired image 201, it should be appreciated that in image 202 the contrast is higher, i.e., the "objects-to-background ratio" is higher, wherein higher contrast is likely to allow easier distinguishing of items in an image.

Figure 4:
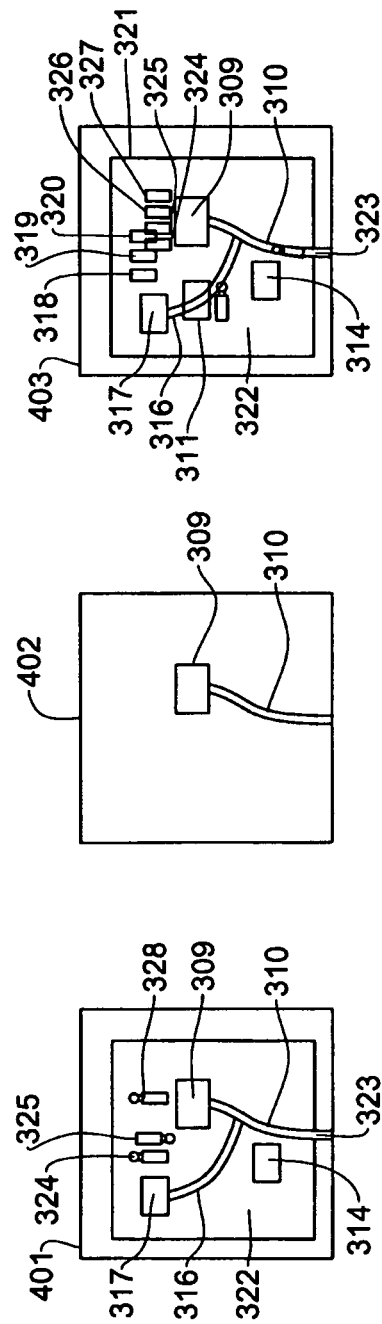
FIG. 4 is a schematic illustration of a composite image based on the images of FIG. 3, obtained in accordance with embodiments of the invention.

Image 401 in FIG. 4 illustrates a non-limiting example of the enhanced image enhancing image 308. The items appearing therein are similar to those appearing in image 308, however, they are clearer and easier to distinguish. Hence, an "enhanced image enhancing a specific acquired image" is a synthetic image whose contrast is higher than the specific acquired image, all the objects appearing therein appear also in the acquired image and vice versa (i.e., all the objects appearing in the acquired image appear also in the synthetic image). The synthetic image and the specific acquired image are considered as "corresponding" to each other. In addition, while the objects included in the enhanced image all appear in the acquired image, it should still be appreciated that the enhanced image is based on a plurality of acquired images, including the corresponding acquired image.

FIG. 4 includes additional schematic images 402 and 403, that are based on processing the series of the temporal images of FIG. 3. Image 403 includes the background of FIG. 3's images as well as every object appearing in one or more thereof. An image resulting of a processing of a certain sequence of temporal images and including the joint background and all objects appearing in the images of the sequence is referred to hereinafter as an "inclusive image" of said certain sequence.

On the other hand, image 402 illustrates only those items appearing in every one of the series' images. An images resulting of a processing of a certain sequence of temporal images and including merely the joint background, i.e. items appearing in all images of the sequence is referred to hereinafter as a "background image" of said certain sequence. Object items do not appear in the background image.

It is appreciated that each one of the acquired images and/or an enhanced image enhancing any one of the acquired images in a series, represent a certain point in time. Unlike them, the background image includes only constant, non-changing items, and therefore it has no correspondence to any specific time point in the time range through which the series' images were taken. Similarly, the inclusive image does not correspond to a certain time point as well.

According to the embodiments of the invention, the inclusive image and the background image are enhanced images.

According to embodiments of the invention, a plurality of acquired images is required for rendering an enhanced image. It should be appreciated that the larger the number of acquired images in a series, the better the expected quality of the enhanced image based thereon, e.g. the higher the expected contrast is. FIG. 5 includes a diagram 501 illustrating integration while creating an enhanced image, in accordance with an embodiment of the invention.

In the figure, a series of eight acquired images forms the basis for rendering an enhanced image 516. The eight images are denoted by reference numerals 502, 503, 504, 505, 506, 507, 508 and 509. According to the embodiment of the invention, groups (for example, groups of two, three, four, etc.) of acquired images (in the example of FIG. 5, groups of two acquired images) are used for rendering intermediate images, denoted 510, 511, 512 and 513. The intermediate images are enhanced images as their contrast is potentially higher in comparison with the contrast of each one of the two images they are based on. Then, groups (for example, groups of two, three, four, etc.) of intermediate images (in the example of FIG. 5, groups of two intermediate images) are used for rendering another generation of intermediate images 514 and 515, whose contrast is higher than the contrast of each one of the intermediate images they are based on (510, 511, 512 and 513) and therefore also of the contrast of each one of the acquired images the intermediate images are based on. Finally, the intermediate images, images 514 and 515 in the example of FIG. 5 are used for rendering the final enhanced image 516 whose contrast is even higher (it should be noted that in other cases more than two intermediate images, e.g. three, four, etc. images, can be used for rendering the final enhanced image). Hence, according to the illustrated embodiment the series of acquired images is integrated into a single enhanced image.

It is possible to describe the integration in terms of "generations", wherein the series of acquired images (502, 503, 504, 505, 506, 507, 508 and 509) constitutes the first generation (L=1), the intermediate images 510, 511, 512 and 513 based thereon constitute the second generation (L=2), the intermediate images 514 and 515 that are based on the second generation's intermediate images constitute the third generation (L=3). The final enhanced image 516 constitutes the forth and, in this case the last generation (L=4). That is, the figure illustrates a four generations integration scheme. In addition, because the series of acquired images constitutes L=1, hereinafter these terms ("L=1" and "the series") are used interchangeably.

It is noted that the scheme of numbering the generations is non-limiting and any other scheme can be used, such as marking the first generation by L=0 instead of L=1, etc. It is further noted that there is no mandatory relation between the order of the images in the series and the time they were taken. Thus, in the example of FIG. 5 it is possible, e.g., that image 505 was taken first, then image 509, then image 502, then image 507 etc., or any alternative order.

Hereinafter, the two images used for rendering an enhanced image are considered as directly relating thereto (e.g., images 510 and 511 directly relate to image 514, images 506 and 507 directly relate to image 512 etc.). Images that are situated more than one generation before an enhanced image relate thereto with indirect relationship. For example, image 502 indirectly relates to image 514 and so does image 505. In addition, image 502 indirectly relates also to image 516. Images relating to each other are considered as relatives while they can be direct relatives or indirect relatives.

It is noted that although diagram 501 illustrates eight acquired images in L=1, which is a power of two, the invention is not limited, neither by this number (eight) nor by this characteristic (power of two), and any number of acquired images can compose the series, as long as the number is larger than one. For example, according to one embodiment, illustrated in FIG. 6A, if the number is not a power of two, it is possible to multiply one or more images in the series, thus yielding an "enriched series", in which at least one image is a multiplication of an acquired image. According to a different embodiment illustrated in FIG. 6B, it is possible to use an intermediate image of any generation with an acquired image from L=1, while rendering a next intermediate image.

It is to be noted that in the example of FIGS. 6A and 6B the groups of acquired images are groups of two acquired images. However, in other cases, when the groups of acquired images are groups of more than two (e.g. three, four, five, etc.) acquired images, the same principles apply, only in such cases, more than one image in a series can be multiplied, or that one image can be multiplied more than one time.

It is to be further noted that in some cases, the acquired images comprising the series may be divided to a-symmetrical groups. In such cases, when grouping the images, one group may consist, for example, of two acquired images whereas another group may consist, for example, of three acquired images, etc.

Further to reviewing the examples of FIGS. 5, 6A and 6B, it becomes evident that according to the invention, an enhanced image is (directly and/or indirectly) based on two or more images. The term "two or more" (or "more than one") is referred hereinafter as "multiple", and therefore an enhanced synthetic image, which is based (directly and/or indirectly) on two or more acquired images, constitutes a "multi look" image, shortly referred to as ML. It is appreciated by those versed in the art that the term "multi look" is presently used for describing an image which results of processing two or more, images. Unlike that, it will be further illustrated below that according to the invention alternative computation may be performed.

In addition, it was previously explained, with reference to the schematic illustration of FIG. 3, that the images in a series are temporal images. Hence, it should be appreciated that an enhanced synthetic image which is based on multiple acquired images, is actually based on multiple temporal images. Hence, such an enhanced synthetic image constitutes also a "multi temporal" image, shortly referred to as MT.

Hence, an enhanced synthetic image obtained in accordance with the invention is an MT image and an ML image, and therefore it constitutes an MTML image. In accordance with this convention, an inclusive image is denoted $MTML_{max}$, while a background image is denoted as $MTML_{background}$ or shortly, $MTML_{back}$.

In addition, it is possible to render an enhanced image whose objects are identical to the objects included in one of the series' images (i), while the background is also preserved as in the i'th image background, but with higher contrast compared thereto. Such an enhanced image, enhancing the i'th image, is referred to, hereinafter, as $MTML_i$. Hence, in a series including images i=1,2, . . . , n there may be n $MTML_i$ images enhancing the series' images, namely these are $MTML_1$, $MTML_2$, $MTML_n$. The convention demonstrated here for numbering the images (1, . . . , n) is non-limiting and any other convention may be used, if applicable, such as 0, 1, . . . , n−1, such as a, b, . . . etc.

The i'th image constitutes a "selected image" (selected to be enhanced by a user) or a "selected acquired image" while the other images in the series constitute "other images" or "other acquired images". An enhanced image relating to the selected image constitutes a "new selected image" or "enhanced selected image", while enhanced images relating only to other images (but not to the selected image) constitutes "new other images" or "enhanced other images".

Moreover, returning to the examples of FIGS. 5, 6A and 6B, it should be appreciated now that the intermediate images are also MTML images. Because each intermediate image is directly related to two previous-generation's images it can also be considered as a two-look image (2-Look image) of the previous generation's images. In cases where more than two images were used for rendering an intermediate image, it can be considered as a three-look image, four-look image, etc. according to the number of images used for rendering it.

According to the invention, enhanced images' rendering, including the intermediate images and final enhanced image, are based on likelihood of discrepancy (shortly referred to as "LD") computations amongst the group of images to which the enhanced image directly relates to.

Figure 7:
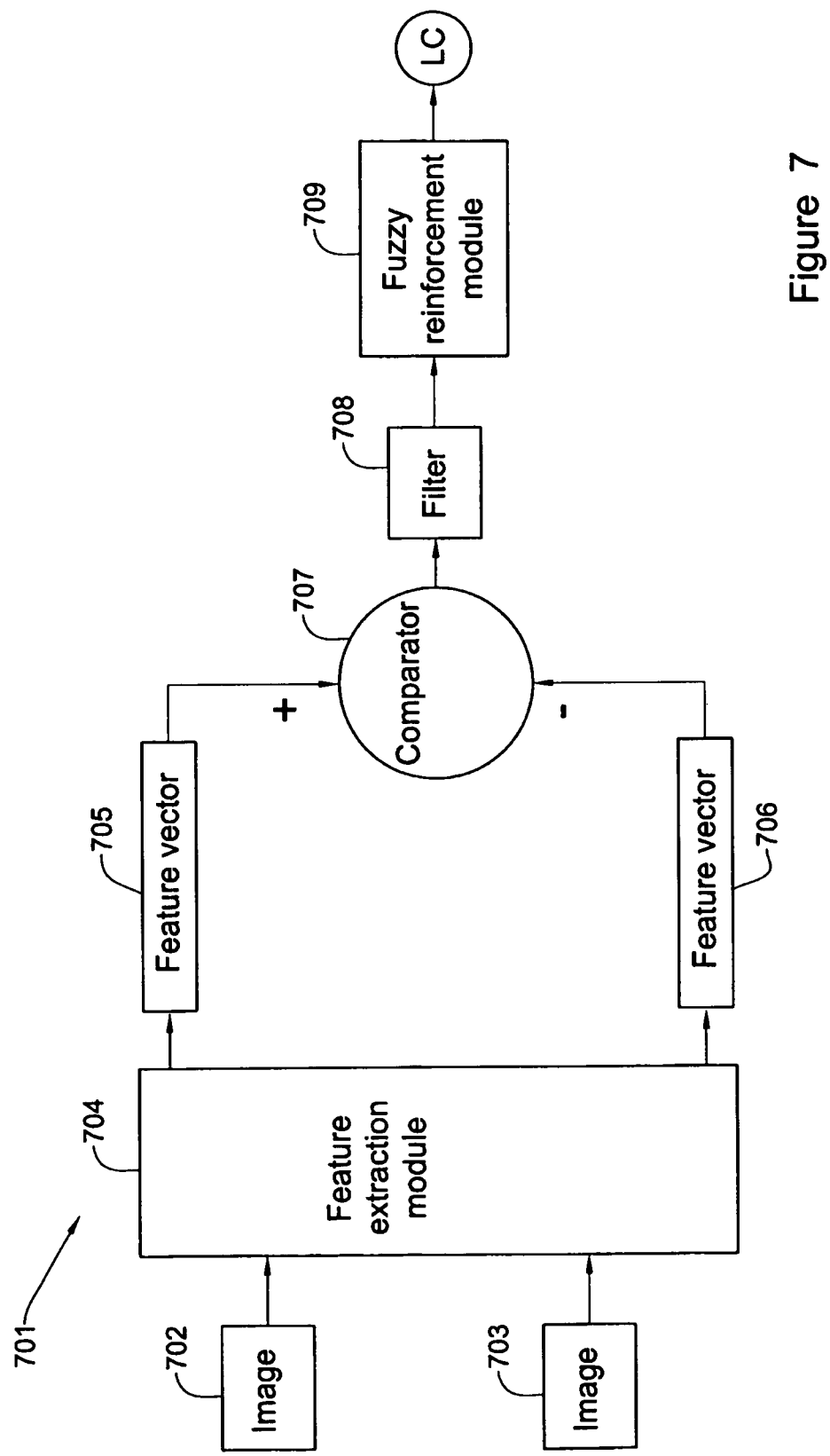
FIG. 7 is a schematic functional block diagram illustrating the main modules in a system configured to detect discrepancies amongst two images, in accordance with one embodiment of the invention.

According to an embodiment of the invention, rendering an enhanced image, whether an intermediate image or a final enhanced image, is based on discrepancy detection amongst the group of images the enhanced image directly relates to. It is to be noted that the process below is described with reference to groups of two images. However, in cases where the group of images comprises more than two images, the calculations can be performed, for example, for at least one couple of images in the group. In such cases, after such calculation, as an example, an average value can be calculated out of the values calculated according to the below process for the at least one couple of images in the group. FIG. 7 is a functional block diagram illustrating the main modules in a system 701 configured to enhance images and detect discrepancies amongst two images, in accordance with one embodiment of the invention. Those versed in the art will readily appreciate that the invention is not bound by the specific architecture illustrated in FIG. 7, equivalent and/or modified functionality may be consolidated or divided in another manner and may be implemented in any appropriate combination of software, firmware and hardware. According to the embodiment, two images, 702 and 703 are fed into a "feature extraction module" 704. For each pixel comprising each image, a vector is created, representing the pixel's characteristics in its surrounding environment. For example, the vector can include a value representing the variability of the pixel, compared to the pixels surrounding it. Hence, the output of the feature extraction module 704, for each pixel, is two vectors, 705 and 706, respective of the two images 702 and 703. Hereinafter, each vector constitutes a "feature vector".

Furthermore, 707 is a comparator that is coupled to the feature extraction module 704. The comparator obtains the two feature vectors 705 and 706, performs, for example, a context based feature comparison, and computes the difference therebetween. The difference is fed into a non-linear filter 708 that is coupled to the comparator 707. The filter 708 is used for normalizing the calculated differences to values in the range of 0-1, wherein the value 0 indicates no change, while 1 indicates a significant change. It is noted though that this convention is non-limiting and another embodiment can use the opposite convention, wherein 0 indicates a significant change while 1 stands for no change. It is also possible to use a different range.

The non-linear filter 708, apart from normalizing the differences, collects information on the other pixels constituting the images and maps the data to yield a "normalized image" of pixels whose values are 0-1. Then, this normalized image is fed into a fuzzy reinforcement module 709 that computes the likelihood of discrepancy (LD), also referred to as "Likelihood of Discrepancy Matrix" or "LD Matrix". LD matrix is indicative of the level of change in a siding window examining the two images 702 and 703. If the normalized difference of most pixels in the window is high, LD will be high, while if most pixels in the window are characterized by a low normalized difference, LD will be low. It will be further described below that the window's size is variable.

Figure 8:
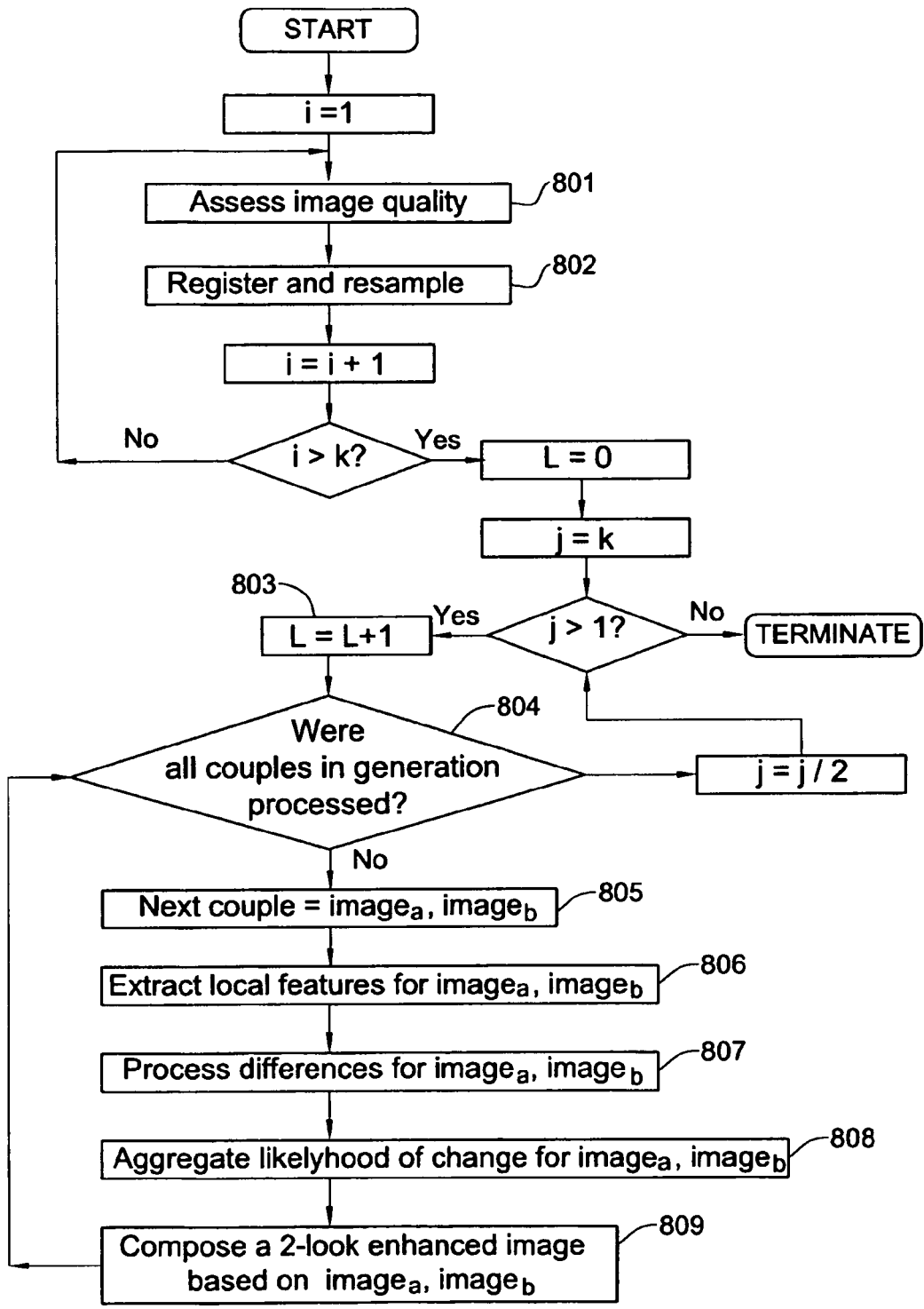
FIG. 8 is a generalized flowchart illustrating one embodiment for rendering an MTML image.

Detailed description of the modules composing the system 701 will follow, but beforehand, FIG. 8 is presented, illustrating one embodiment for rendering an MTML image, based on a series of k images, in accordance with one embodiment of the invention. For simplicity assumption is made that k is a power of two. However, as it was previously explained, e.g., with reference to FIGS. 5, 6A and 6B, this is non-limiting.

As illustrated in the flowchart, according to the embodiment, in 801 image quality is assessed for the k images in the series while in 802 registration and resampling is performed, bringing all the series' images to the current image plane.

Presently, two embodiments are considered. According to one of these embodiments, it is assumed that all the acquired images used according to the invention are valid images having an acceptable quality. Therefore, according to this embodiment, 801 may be skipped. However, those versed in the art may appreciate that sometimes an image might be invalid or deteriorated. Hence, the second of the two embodiments considers this possibility, wherein one or more of the images in the series are deteriorated. According to this second embodiment, it is possible to assess the image quality (as performed in 801), e.g., by comparing it to another image whose quality is known, in accordance with Wang et al. "*Image Quality Assessment: from Error Visibility to Structural Similarity*", for example with adaptations respective of SAR that are clear to those versed in the art. If the assessment confirms that the current image's quality is inferior to the other image's quality, the image can be excluded from the series and will not be a part of the enhancement process.

When all k images are registered and resampled, enhanced images' rendering can begin. As was previously explained with reference to the examples of FIGS. 5, 6A and 6B, for example, rendering is performed in generations (L=1, 2, ... ). Thus, couples of one generation are processed in order to render enhanced images of the next generation, then forming basis for rendering the next generation and so on (see, e.g., 803 and 804).

For each couple (represented by $Image_a$ and $Image_b$, see, e.g., 805), local features are extracted on 806, processing of differences is performed on 807 (wherein processing of differences includes computing the differences and normalization thereof), LD is aggregated (808) and on 809 a 2-Look enhanced image is rendered, while it is noted that this 2-Look enhanced image forms part of the next generation (L+1).

Upon processing all the couples in the present generation (L), if the next generation includes a single image (wherein j/2 is greater than 1), processing terminates and the single enhanced image of L+1 becomes the final enhanced image.

It is to be noted that in the example of FIGS. 8 the groups of acquired images are couples of acquired images. However, in other cases, when the groups of acquired images are groups of more than two (e.g. three, four, five, etc.) acquired images, the same principles apply, with some modifications as detailed above.

Figure 9:
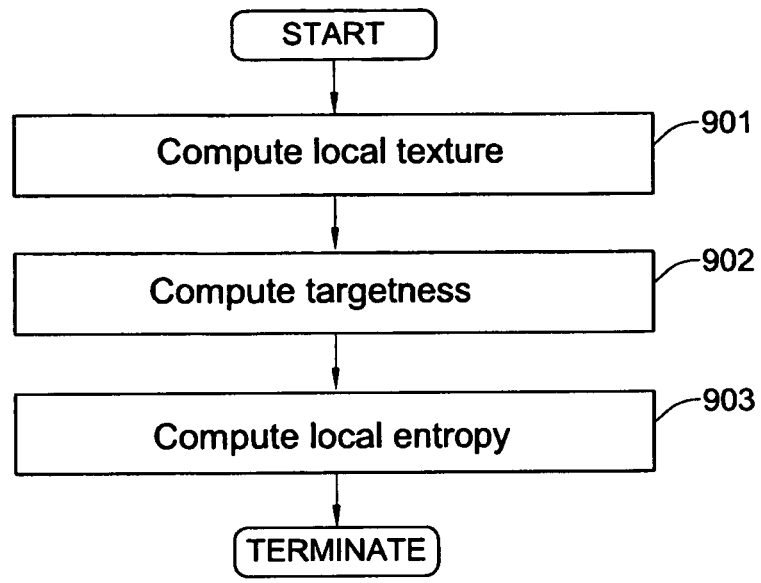
FIG. 9 is a generalized flowchart describing exemplary operations taken during feature extraction, according to one alternative embodiment of the invention.
Figure 10:
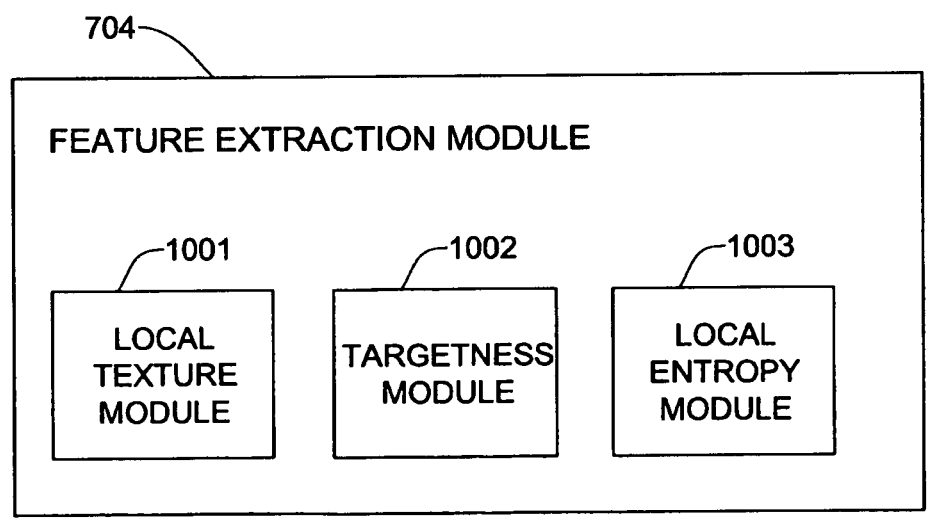
FIG. 10 is a functional block diagram schematically illustrating the exemplary modules operative in the feature extraction module, according to the embodiment.

FIG. 9 is a flowchart describing exemplary operations taken during feature extraction 806, according to one alternative embodiment of the invention, while FIG. 10 is a block diagram schematically illustrating exemplary modules operative in the feature extraction module 704, according to the embodiment. The feature extraction's products are later used for determining likelihood of discrepancy, as was illustrated with reference to FIG. 8.

According to the embodiment illustrated in FIG. 9, two characteristics are determined. Namely, these are local texture 901, targetness 902 and local entropy 903. These characteristics are computed by the local texture module 1001, the targetness module 1002 and the local entropy module 1003 illustrated in FIG. 10. It is noted though, that alternative embodiments may apply only a subset of the modules illustrated in FIG. 10 and hence, it is not obligatory to compute all the characteristics mentioned herewith (in FIG. 9). According to the invention, any one or two of the characteristics can be computed. Therefore, in a general manner, one or more characteristics can be computed. Those skilled in the art will readily appreciate that in addition or instead of the characteristics described above additional and/or alternative characteristics can be computed, including, in an exemplary manner, local mean, local standard deviation, coefficient of variation, concurrence matrix (along with its associated features, such as: homogeneity, contrast, energy, brightness, etc.), etc. For that purpose, other operations and corresponding modules may be introduced to the system 701. In addition, although FIG. 9 illustrates the features computation as a sequential process, it should be emphasized that the order of computations is non-limiting; moreover, it is also allowed to use parallel computing for computing the different characteristics.

Each characteristic is computed, substantially for every pixel in the common area of interest in the image. The pixel presently analyzed for computing its characteristics constitutes an "analyzed pixel". In order to compute the characteristics, the analyzed pixel is covered by a sliding window while the analyzed pixel is in the window's center. It is explained, in this connection, that different characteristics may required different sliding windows for computation thereof.

Understanding that the invention is in the field of images analysis and embodiments thereof allow discrepancy detection, it can be appreciated that analysis may include searching for something specific, namely a "target" in the images.

An example is now provided in order to simplify further explanation. According to the example, a municipality of a city would like to view images of the city in order to identify new constructions, hence being able to enforce legal constructions. Images having higher contrast will assist the operator in identifying the items appearing in each image. In addition, analysis of a series of images will allow discrepancy detection, i.e., detection of newly constructed or destructed items.

It was previously explained, e.g., with reference to FIG. 7, that according to embodiments of the invention, during feature extraction a sliding window is set. Returning to the latter example, it is assumed that very big or huge buildings constructed in the city are well recognized even without the benefits provided by the present invention. However, if somebody builds a room on top of his building's roof, image analysis in accordance with the invention may assist in detection thereof. According to this example, and as indicated above, a municipality can define the requirement to detect constructions whose size is 5 meters over 5 meters (i.e., 25 square meters) or less, i.e., the target's size is 5×5 meters. It is noted that 5×5 is only a non-limiting example and any other window size can be defined, as required, such as 3×3, 9×9, etc. If one pixel represents, e.g., one square meter (as indicated by the received pixel size parameter), the sliding window in the first case (5×5 meters) would be at least 5×5 pixels (25 pixels), while in the second case (3×3 meters) it would be at least 3×3 pixels (i.e., 9 pixels). Hence, the window's size is affected, as was previously explained, by the target's expected size and by the pixel size. The described embodiment requires a window whose size is measured by an odd number of pixels, however, this is non-limiting and other embodiments may allow windows having even number of pixels as their width and height (e.g. 4×4, 10×10, etc.).

Figure 11:
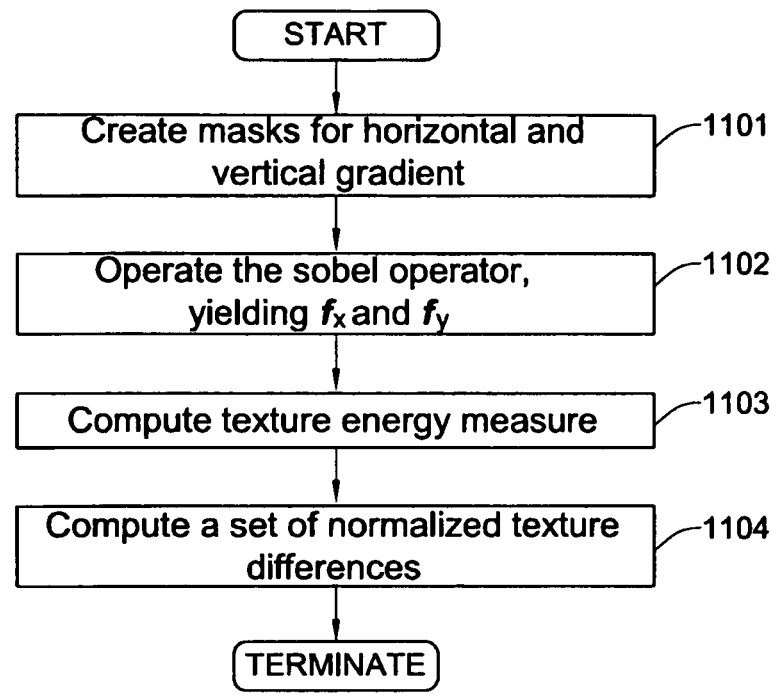
FIG. 11 illustrates determining local texture, according to one embodiment of the invention.

FIG. 11 illustrates how local texture can be determined in 901 according to one embodiment of the invention. It is noted that the embodiment presented with reference to FIG. 11 can be implemented, for example, by the local texture module 1001.

For the local texture characteristic, the sliding window constitutes a "local texture sliding window". In the below example, the local texture is calculated using the gradient of the image intensity at each point and the Sobel operator used for calculating it which are familiar to those versed in the art of image processing. It is to be noted that such calculation of the local texture is a mere example of one method of calculating it and accordingly, other methods may be utilized for calculating the local texture.

Figure 12:
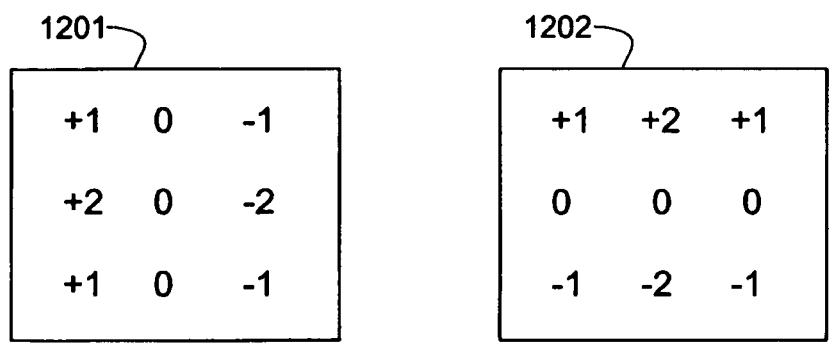
FIG. 12 presents two illustrative masks, for horizontal and vertical gradients, to be used with a 3×3 sliding window according to one embodiment of the invention.

Turning to the exemplary calculation of the local texture, in case of a 3×3 local texture sliding window, for example, two masks, constituting "convolution kernels", are created in 1101, one for the horizontal gradient and the other for the vertical gradient. These illustrative masks are presented in FIG. 12, wherein 1201 is the mask respective of the horizontal gradient and 1202 is the mask respective of the vertical gradient. It is noted though that the illustrated masks are non-limiting and if the sliding window has a different size the masks would change accordingly.

A method for obtaining the masks is presented, e.g., by Linda Shapiro and George Stockman's "*Computer Vision*".

The output of the Sobel operator is two functions. Namely, these are $f_x$ for the horizontal gradient and $f_y$ for the vertical gradient. These functions are combined to obtain the gradient image $I_g$ in accordance with Equation 1:

$$I_g = \sqrt{f_x^2 + f_y^2} \qquad \text{Equation 1}$$

Image $I_g$ forms the input for the convolution operation presented in Equation 2:

$$TEM(x, y) = \sqrt{\frac{1}{w^2} \sum_{i=-w/2}^{w/2} \sum_{j=-w/2}^{w/2} I_g^2(x+i, y+j)} \qquad \text{Equation 2}$$

Wherein:
TEM stands for Texture Energy Measure and according to the embodiment it is computed for each pixel in every one of the n images in the series;
x and y stand for the central pixel of the sliding window;
i and j identify pixel displacement around the local texture sliding window's central pixel x, y that is the analyzed pixel; and
w is the local texture sliding window's width and height.

The result of operating Equation 2 on each pixel in every image is a set of texture energy images. For the texture energy image of each pixel normalized differences are processed in accordance with Equation 3:

$$R = 1 - \frac{2 \times TEM_a \times TEM_b}{(TEM_{aa} + TEM_{bb})}; 0 \leq R < 1 \qquad \text{Equation 3}$$

Wherein
R is the set of normalized texture differences;
$TEM_a$ is the result obtained by operating Equation 1 on $Image_a$;
$TEM_b$ is the result obtained by operating Equation 1 on $Image_b$;
$TEM_{aa}$ is $(TEM_a)^2$; and
$TEM_{bb}$ is $(TEM_b)^2$.

It can be appreciated that for two totally identical images a and b, $TEM_{aa} = TEM_{bb} = TEM_{ab}$, wherein $TEM_{ab}$ is ($TEM_a \times$ TEM$_b$), and therefore R equals zero. However, the bigger is the difference between the images the smaller is the value of TEM$_a$ ×TEM$_b$=TEM$_{ab}$, and therefore R approaches 1.

R is the normalized local texture difference or the likelihood of discrepancy in texture. It reflects the probability that a discrepancy exists between a single pixel within an image compared to the parallel pixel in the second image.

The embodiment presented so far with reference to processing the local texture difference, R, is non-limiting and additional/alternative embodiments are allowed if applicable. One such embodiment is presented with reference to the following Equation 4 and Equation 5:

$$G=1-\exp(-f/k\times\mu_{loc}) \quad \text{Equation 4}$$

$$R=abs(G_a(TEM_a)-G_b(TEM_b)) \quad \text{Equation 5}$$

Wherein:

$G_a$ and $G_b$ are the G values computed in accordance to Equation 4 for pixels in Image$_a$ and Image$_b$, respectively;

f represents reflection of a pixel, f≥0;

$\mu_{loc}$=mean(f), the mean reflection of pixels in an extended neighborhood of the pixel; and k is a constant. For a non-limiting example, k=0.3.

According to the embodiment, the extended neighborhood of a pixel covers three time the target size. However, this is non-limiting and other variants may exist, if applicable. However, it should be appreciated that the extended neighborhood is larger in size than the targetness sliding window size as well as the expected target size.

It is explained that Equation 4 is a normalizing function, transferring values into a 0-1 range. Here it was presented in connection with Equation 5 however Equation 4 can be used elsewhere as well.

Before returning to FIG. 11, it is explained, with reference to FIG. 7, that for local texture, Equation 1 may form part of the feature extraction module 704, while Equation 2 may form part of the comparator 707. Returning now to FIG. 11, further to operating the Sobel Operator in 1102, on 1103 the texture energy measure is computed, e.g., in accordance with Equation 1. On 1104 the set of normalized texture differences is processed, e.g., in accordance with Equation 2.

Figure 13:
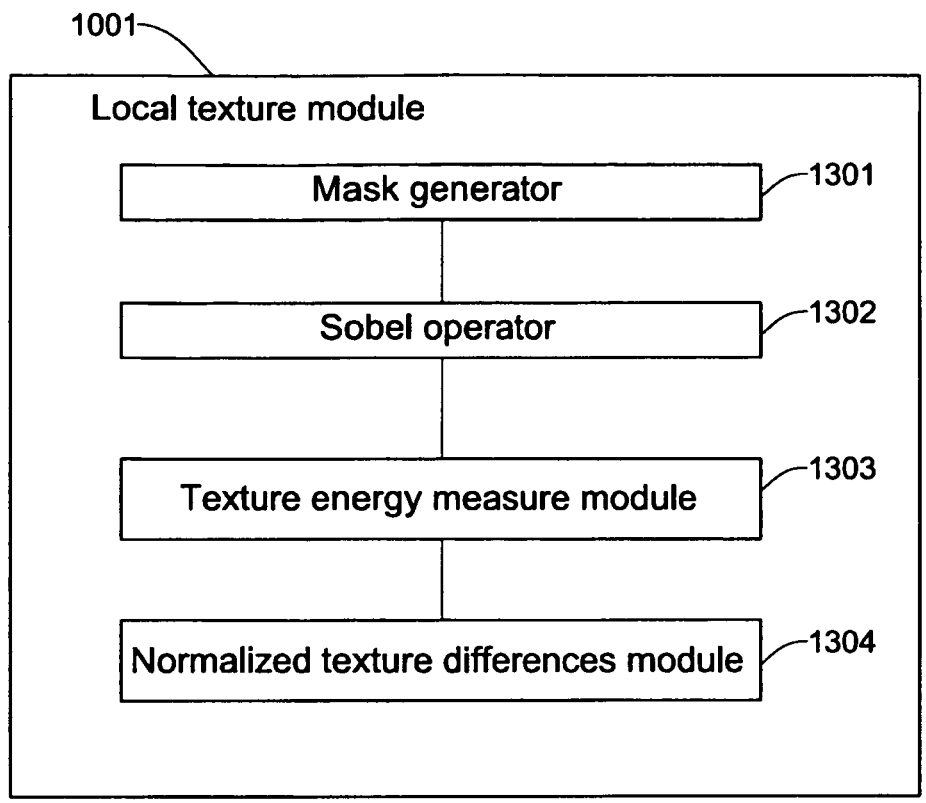
FIG. 13 is a functional block diagram schematically illustrating the local texture module, according to one embodiment of the invention.

FIG. 13 is a block diagram schematically illustrating the local texture module 1001, according to one embodiment of the invention. 1301 is the mask generator wherein masks are generated. 1302 is the Sobel operator. 1303, a texture energy measure module, is coupled to the Sobel Operator for obtaining $f_x$ and $f_y$ therefrom. In this module texture energy measure is computed, see also 1103. 1304 is a normalized texture differences module. It is coupled to the texture energy differences module and is configured to process a set of normalized texture differences (see 1104).

Further to explaining local texture extraction, attention is moved towards targetness: It is desired to emphasize the objects compared to the background. Because analysis is performed in a sliding window whose size is adapted to the target size, it is appreciated that the embodiment emphasizes targets over the immediate background thereof.

It was mentioned before that the sliding window used for targetness computation is not necessarily identical to the sliding window used for local texture computation. Hence, the sliding window respective of targetness computation constitutes a "targetness sliding window". The targetness sliding window's size is frequently smaller than the target size and therefore smaller than the local texture sliding window's size. The basis of determining the targetness sliding window's size will be described below.

Figure 14:
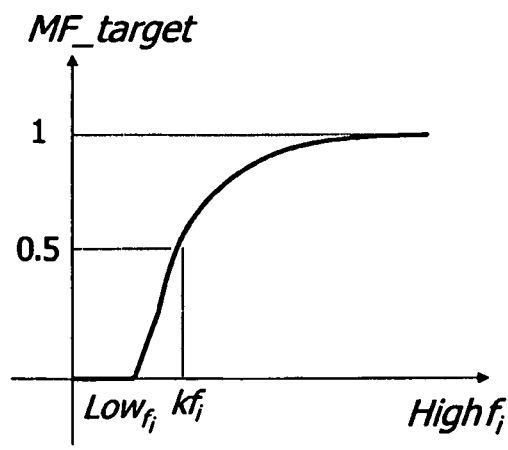
FIG. 14 is a graph illustrating higher reflection of object (and hence targets) compared to the background.

The target objects in the SAR image generate stronger returns compared to the returns generated by the background. The targetness characteristic implemented in accordance with certain embodiments of the present invention further enhances the difference in returns by the target images and the background. FIG. 14 graphically represents the function that normalizes the target's reflection into a 0-1 range, wherein to black (low reflection) pixels are represented by 0 while white pixels (higher reflection) are represented by 1. It should be understood that such normalization can be done, for example, in accordance with Equation 4, as appears above.

Based on G, the targetness can be computed, e.g., in accordance with Equation 6:

$$T = \frac{\prod_{j=1}^{n} G_j}{\prod_{j=1}^{n} G_j + \sum_{j=1}^{n} \overline{G}_j}; \quad \text{Equation 6}$$

Wherein $0<G_j<1$; and $\overline{G}_j=1-G_j$ n is the number of pixels forming the targetness sliding window; and T stands for targetness value. It should appreciated hence that 0<T<1

The reinforcement operator in the Equation 6 is a fuzzy logic operator characterized as following: in a case when all inputs are high, e.g. all input values Gj are higher than 0.5 in the normalized range (0, 1), the operator generates values of T higher than any of the input values. In a case when all inputs are low e.g. lower than 0.5, the operator generates values of T lower than any input values Gj. In generality, the full reinforcement operator strengthens high value pixels and weakens low value pixels.

The targetness sliding window size is usually a constant size of 3×3 pixels. Larger window sizes can be considered such as 5×5 or 7×7 pixels, but the 3×3 window is more efficient and therefore is usually employed. However, the window size should be always smaller than the smallest target of interest. For example, if the smallest target of interest is 4×4 pixels than the targetness sliding window size will preferably be 3×3. If the smallest target is of 5×5 pixels, the targetness sliding window size will preferably be 3×3 although 4×4 may be considered as we.

Similar to R with local texture (whether based on Equation 2 or on Equation 5), it is possible to calculate the likelihood of discrepancy relating to targetness as well. Understanding that T represents the targetness value of a certain pixel it can be computed separately for each pixel in the image. Furthermore, in two images a and b, $T_a$ represents the targetness value of the certain pixel within image a, while $T_b$ represents the targetness value of the corresponding pixel in image b. The targetness likelihood of discrepancy, denoted as $T_{diff}$ can be calculated, e.g., in accordance with Equation 7:

$$T_{diff}=T_a\times(1-T_b)+T_b\times(1-T_a) \quad \text{Equation 7}$$

It is to be noted that such calculation of the targetness is a mere example of one method of calculating it and, accordingly, other methods may be utilized for calculating the targetness.

Turning to local entropy calculation, the local entropy between two images $image_a$ and $image_b$ is calculated in accordance with Equation 8:

$$H(i, j) = -\sum_{k=1}^{2} p_k(i, j) \cdot \log_2[p_k(i, j)] \quad \text{Equation 8}$$

Wherein:

$$p_k(i, j) = \frac{\lambda_k(i, j)}{\lambda_1(i, j) + \lambda_2(i, j)}$$

$k = 1, 2;$ $$\lambda_{1,2}(i, j) = \frac{1}{2}(C_{aa}(i, j) + C_{bb}(i, j)) \pm$$

$$\frac{1}{2}\sqrt{(C_{aa}(i, j))^2 + (C_{bb}(i, j))^2 - 2 \cdot C_{aa}(i, j) \cdot C_{bb}(i, j) + 4 \cdot |C_{ab}(i, j)|^2}$$

and $$C_{x,y}(i, j) = E[(image_x(i, j) - E(image_x(i, j)))\times$$
$$E[(image_y(i, j) - E(image_y(i, j))^*]$$

Wherein E[ . . . ] is the expectation operator and * denotes conjugate.

$C_{xy}$ is the covariance matrix of $image_x$ and $image_y$.

It is to be noted that according to the last equation:

$C_{aa}(i,j)=E[(image_a(i,j)-E(image_a(i,j)))\times E[(image_a(i,j)-E(image_a(i,j))*]$ $C_{ab}(i,j)=E[(image_a(i,j)-E(image_a(i,j)))\times E[(image_b(i,j)-E(image_b(i,j))*]$ $C_{ba}(i,j)=E[(image_b(i,j)-E(image_b(i,j)))\times E[(image_a(i,j)-E(image_a(i,j))*]$ $C_{bb}(i,j)=E[(image_b(i,f)-E(image_b(i,j)))\times E[(image_b(i,j)-E(image_b(i,j))*]$ As an exemplary alternative to the calculation performed in Equation 8, it is also possible to operate a reinforcement operator on the normalized eigenvalues ($p_k(i,j)$) according to the following equation:

$$LDH(i, j) = \frac{(p_1(i, j)) * (1 - p_2(i, j))}{(p_1(i, j)) * (1 - p_2(i, j)) + (1 - p_1(i, j)) * (p_2(i, j))}$$

Each pixel within H(i,j) represents the local entropy value of the corresponding pixel. The higher the value is, the higher the likelihood of discrepancy is.

Each pixel within LDH(i,j) represents the likelihood of discrepancy based on the normalized eigenvalues of the covariance matrix $C_{xy}$. The higher the value is, the higher the likelihood of discrepancy is.

It is to be noted that such calculations of the local entropy are mere examples of methods of calculating it and, accordingly, other methods may be utilized for calculating the local entropy.

It should be appreciated that the exemplary embodiments of the invention presented above computes three characteristics for the purpose of detecting discrepancies between images. Namely, these characteristics are local texture, entropy and targetness. As noted above, as a person of ordinary skill in the art can appreciate, less and/or additional and/or other characteristics may be utilized for that purpose. The overall likelihood of discrepancy, LD, at each pixel is computed for combining the LD previously calculated for the different characteristics. For example, in the example of combining local texture and targetness, the overall LD is computed by combining the local texture difference R (see Equation 3 or Equation 5 above) and the local targetness difference $T_{diff}$(see Equation 7 above), e.g. according to Equation 9 below:

$$LD = \frac{R * T_{diff}}{R * T_{diff} + (1 - R) * (1 - T_{diff})} \quad \text{Equation 9}$$

In light of the previous paragraph, notice that Equation 9 represents in fact a particular case of Equation 6 for the case of two variables only, e.g. R and $T_{diff}$. However if the number of characteristics used to assess the likelihood of discrepancy is higher than two, Equation 6 above should be used where in that case n should be the actual number of characteristics employed to assess the likelihood of discrepancy, LD.

Once the LD is calculated for a certain group of images (in the above example images a and b), an intermediate enhanced image can be calculated, for example according to Equation 10:

$ml2=LD\cdot image_a+(1-LD)\cdot(image_a+image_b)/2;$ \quad Equation 10

Wherein in case that the "selected image" (selected to be enhanced by a user) or an "enhanced selected image" (also referred to as "new selected image", which is an enhanced image relating to the selected image) is part of the group of images corresponding to the calculated LD, $image_a$ in Equation 10 will represent that image (the selected image or the enhanced selected image). In other cases, $image_a$ can represent any one of the images in the group. It can be appreciated from Equation 10 above, that for a very low discrepancy value e.g. LD≈0, ml2=($image_a$+$image_b$)/2 e.g. ml2 is the constraint average of the two input images $image_a$ and $image_b$. On the other hand, for very high discrepancies values e.g. for LD≈1, ml2=$image_a$. For any other value of discrepancy e.g. 0<LD<1 the intermediate enhanced image ml2 is a weighted combination between the constrained mean of the two images and image. (which, as noted above, is the selected image or the enhanced selected image if such image is part of the group of images corresponding to the calculated LD). It can be appreciated that $image_a$ is considered as a leading image on which the enhancement is based. In the calculation described above, the higher the LD value is—the weight of the leading image in the calculation is higher.

It is to be noted that the background image ($MTML_{back}$) can be calculated in accordance with the following equation:

$ml2_{back}=(1-LD)\cdot(image_a+image_b)/2+$
$LD\cdot \min(image_a, image_a);$ \quad Equation 8

It is to be noted that the inclusive image ($MTML_{max}$) can be calculated in accordance with the following equation:

$ml2_{back}=(1-LD)\cdot(image_a+image_b)/2+$
$LD\cdot \max(image_a, image_a);$ \quad Equation 12

Further to understanding the presented embodiments for rendering the $MTML_i$, $MTML_{max}$, and $MTML_{background}$ images it can be appreciated that in the RGB color model (wherein RGB stands for Red, Green and Blue, as known to those versed in the art) it is possible to use a single primary color (red, green or blue) for displaying each one of the three images. It is also possible to select a combination of two images out of the three, displaying one of the two using a single primary color, while the other is displayed using a combination of the two other primary colors. The two other primary colors form a "sub-set" of primary colors. An image displayed using a single primary color or a combination of sub-set of primary colors constitutes, hereinafter, a "colored image". For example, one embodiment uses a combination of red and blue for displaying the $MTML_{background}$ image, while green is used for displaying the $MTML_i$ image.

If the primary colors are balanced and if the colored images are superimposed it can be appreciated that in the resulting superimposed image background items will appear in the black/grey/white scale, while objects appearing in the i'th acquired image (and therefore in $MTML_i$) but not in the background image will appear green.

According to a different example, it is possible to select, color and superimpose two different MTML images relating to different acquired images. For example, $MTML_j$ and $MTML_k$, while $MTML_j$ is displayed using a combination of red and blue while $MTML_k$ is displayed in green. In this example, background items, i.e., those items appearing in both images, will appear in the black/grey/white scale, object items appearing only in $MTML_j$ will appear red/pink/blue, and objects appearing only in $MTML_k$ will appear green.

It should be appreciated that other combinations are allowed, according to the case. For example, it is possible to use red for displaying $MTML_{background}$, green for $MTML_k$ and blue for $MTML_j$, etc.

Thus, displaying several images of a scene in RGB allows automatic detection of discrepancies occurring amongst the images. The presentation of the discrepancies using colors is intuitive and assists an interpreter (a person interpreting the images) in his work of understanding of discrepancies occurring in the scene.

It is noted though that RGB is not a limitation of the invention and it is possible to use other color models such as subtractive color models (e.g., CMYK, which stands for Cyan, Magenta, Yellow and Key that is black) or any other model.

It will be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. In addition, those versed in the art would appreciate that a system according to the invention can be hardware. Alternatively, the system can compose hardware and software components.

While the invention has been shown and described with respect to particular embodiments, it is not thus limited. Numerous modifications, changes and improvements within the scope of the invention will now occur to the reader.

The invention claimed is:

1. A method for computerized generation of an enhanced image based on a plurality of images, utilizing a processor, the method comprising:
   (a) receiving a plurality of registered images, each comprising a common area of interest;
   (b) receiving processing parameters;
   (c) grouping, by said processor, said plurality of registered images into one or more groups;
   (d) processing, by said processor, the images within said one or more groups, wherein said processing comprises:
      i) for each given pixel within the common area of interest, calculating a likelihood of discrepancy between respective pixels of the registered images of said one or more groups, thus giving rise to likelihood of discrepancy values characterizing said given pixel;
      ii) generating a "likelihood of discrepancy matrix" comprising the likelihood of discrepancy values and characterizing the likelihood of discrepancy for each pixel within the common area of interest;
      iii) for each of said one or more groups, generating an enhanced image while utilizing said likelihood of discrepancy matrix.

2. The method of claim 1, wherein in case more than one enhanced image is generated the method further comprises:
   (a) grouping said enhanced images into one or more groups;
   (b) processing the images within said one or more groups, wherein said processing comprises:
      i) for each given pixel within the common area of interest, calculating a likelihood of discrepancy between respective pixels of the registered images of said one or more groups, thus giving rise to likelihood of discrepancy values characterizing said given pixel;
      ii) generating a "likelihood of discrepancy matrix" comprising the likelihood of discrepancy values, characterizing the likelihood of discrepancy for each pixel within the common area of interest;
      iii) for each of said one or more groups, generating an enhanced image while utilizing said likelihood of discrepancy matrix
   (c) repeating steps (a) and (b) until a single enhanced image is created.

3. The method of claim 1, wherein in case any of said groups consists more than two images, said generating a "likelihood of discrepancy matrix" for that group comprises:
   (a) generating a likelihood of discrepancy matrix for at least one possible couple within the group;
   (b) calculating an average likelihood of discrepancy matrix corresponding to all likelihood of discrepancy matrices generated for said at least one possible couple in the group.

4. The method of claim 1, wherein each pixel in said enhanced image is calculated as a weighted combination between respective pixels of the images in the group, wherein the weights of the respective pixels are defined by their respective values within the likelihood of discrepancy matrix.

5. The method of claim 4, further comprising selecting an image to be enhanced, wherein the pixel corresponding to the selected image is provided with additional weight in the weighted combination proportional to the likelihood of discrepancy value.

6. The method of claim 1, wherein said generating an enhanced image comprises improving the contrast of at least one of said plurality of registered images.

7. The method of claim 1, wherein said generating an enhanced image comprises reducing noise in at least one of said plurality of registered images.

8. The method of claim 1, wherein said processing parameters include at least one of the following:
   (a) an indication of a selected image to be enhanced;
   (b) a target size parameter, representing the size of an object of interest;
   (c) a pixel size parameter, representing the size of an area covered by a single pixel in an image.

9. The method of claim 1, wherein said generating a likelihood of discrepancy matrix includes:
   (a) computing one or more characteristics for each of said respective pixels of the images of said one or more groups, thus giving rise to computed characteristics; and
   (b) processing said computed characteristics for obtaining normalized differences values amongst each of said respective pixels of the images of said one or more groups, constituting the likelihood of discrepancy matrix respective of the one or more characteristics of each of said respective pixels of the images of said one or more groups.

10. The method of claim 9, wherein said characteristics include at least one of the following:
(a) local targetness calculations;
(b) local texture calculation;
(c) local entropy calculations.

11. The method of claim 10, wherein said local texture calculation is computed in accordance with $$I_g = \sqrt{f_x^2 + f_y^2}$$

$$TEM(x, y) = \sqrt{\frac{1}{w^2}\sum_{i=-w/2}^{w/2}\sum_{j=-w/2}^{w/2} I_g^2(x+i, y+j)}$$

Wherein:
$f_x$ and $f_y$ are the output of a Sobel operator applied to pixels in each image;
x and y stand for the central pixel of a local texture sliding window;
i and j identify pixel displacement around the local texture sliding window's central pixel x, y;
w is the local texture sliding window's width and height.

12. The method of claim 11, wherein obtaining normalized differences is done in accordance with $$R = 1 - \frac{2 \times TEM_a \times TEM_b}{(TEM_{aa} + TEM_{bb})}; 0 \leq R < 1$$

wherein:
$TEM_a$ is the local texture obtained for $Image_a$, amongst respective group;
$TEM_b$ is the local texture obtained for $Image_b$ amongst said respective group;
$TEM_{aa}$ is $(TEM_a)^2$; and
$TEM_{bb}$ is $(TEM_b)^2$.

13. The method of claim 10, wherein said local targetness calculation is computed in accordance with $$T = \frac{\prod_{j=1}^{n} G_j}{\prod_{j=1}^{n} G_j + \prod_{j=1}^{n} \overline{G}_j};$$

wherein:
n is the number of pixels forming a targetness sliding window;
$G_j$ is the G value computed for a pixel j in accordance with:

$$G = 1 - \exp(-f/k \times \mu_{loc})$$

wherein:
f represents reflection of a pixel;
$\mu_{loc}$=mean(f), the mean reflection of pixels in an extended neighborhood of the pixel;
k is a constant.

14. The method of claim 13, wherein obtaining normalized differences is done in accordance with $$T_{diff} = T_a \times (1-T_b) + T_b \times (1-T_a)$$

wherein
$T_a$ and $T_b$ stand for targetness (T) of corresponding pixels in $Image_a$ and $Image_b$, respectively.

15. The method of claim 1, wherein said group comprises two images.

16. The method of claim 1, wherein said images are SAR (Synthetic Aperture Radar) images.

17. The method of claim 1, wherein said plurality of registered images originate from more than one platform.

18. A computer program comprising computer program code means for performing all the steps of claim 1 when said program is run on a computer.

19. The method of claim 1 wherein the likelihood of discrepancy calculated between respective pixels related to an object in a common area of interest of several registered images is indicative of likelihood of absence of the object in at least one of the images in said group.

20. A system capable of generating an enhanced image based on a plurality of images, the system comprises a processor operatively connected to an image input block and a processing parameters input block;
said image input block is configured to receive a plurality of registered images, each comprising a common area of interest;
said processing parameter input block is configured to receive processing parameters;
said processor is configured to group said plurality of registered images into one or more groups and process the images within said one or more groups, including at least the following:
i) for each given pixel within the common area of interest, calculate a likelihood of discrepancy between respective pixels of the registered images of said one or more groups, thus giving rise to likelihood of discrepancy values characterizing said given pixel;
ii) generate a "likelihood of discrepancy matrix" comprising the likelihood of discrepancy values and characterizing the likelihood of discrepancy for each pixel within the common area of interest;
iii) for each of said one or more groups, generate an enhanced image while utilizing said likelihood of discrepancy matrix.

21. The system of claim 20, wherein in case more than one enhanced image is generated the processor is further configured to perform at least the following:
(a) group said enhanced images into one or more groups;
(b) process the images within said one or more groups, including at least the following:
i) for each given pixel within the common area of interest, calculate a likelihood of discrepancy between respective pixels of the registered images of said one or more groups, thus giving rise to likelihood of discrepancy values characterizing said given pixel;
ii) generate a "likelihood of discrepancy matrix" comprising the likelihood of discrepancy values, characterizing the likelihood of discrepancy for each pixel within the common area of interest;
iii) for each of said one or more groups, generate an enhanced image while utilizing said likelihood of discrepancy matrix
(c) repeat steps (a) and (b) until a single enhanced image is created.

22. The system of claim 20, further comprising a display wherein said processor is further configured to display said enhanced image on said display.

23. The system of claim 20, wherein in case any of said groups consists more than two images, said generate a "likelihood of discrepancy matrix" for that group comprises:
(a) generate a likelihood of discrepancy matrix for at least one possible couple within the group;

(b) calculate an average likelihood of discrepancy matrix corresponding to all likelihood of discrepancy matrices generated for said at least one possible couple in the group.

24. The system of claim 20, wherein each pixel in said enhanced image is calculated as a weighted combination between respective pixels of the images in the group, wherein the weights of the respective pixels are defined by their respective values within the likelihood of discrepancy matrix.

25. The system of claim 24, wherein said processor is further configured to receive a selection of an image to be enhanced, and wherein the pixel corresponding to the selected image is provided with additional weight in the weighted combination proportional to the likelihood of discrepancy value.

26. The system of claim 20, wherein said processor is configured to perform an enhancement of the contrast of at least one of said plurality of registered images during generation of an enhanced image.

27. The system of claim 20, wherein said processor is configured to reduce noise in at least one of said plurality of registered images during generation of an enhanced image.

28. The system of claim 20, wherein said processing parameters include at least one of the following:
   (a) an indication of a selected image to be enhanced;
   (b) a target size parameter, representing the size of an object of interest;
   (c) a pixel size parameter, representing the size of an area covered by a single pixel in an image.

29. The system of claim 20, wherein said processor is configured to perform at least the following steps during said generation of a likelihood of discrepancy matrix:
   (a) compute one or more characteristics for each of said respective pixels of the images of said one or more groups, thus giving rise to computed characteristics; and
   (b) process said computed characteristics to obtain normalized differences values amongst each of said respective pixels of the images of said one or more groups, constituting the likelihood of discrepancy matrix respective of the one or more characteristics of each of said respective pixels of the images of said one or more groups.

30. The system of claim 29, wherein said characteristics include at least one of the following:
   (a) local targetness calculations;
   (b) local texture calculation;
   (c) local entropy calculations.

31. The system of claim 30, wherein said processor is configured to perform local texture calculation in accordance with $$I_g = \sqrt{f_x^2 + f_y^2}$$

$$TEM(x, y) = \sqrt{\frac{1}{w^2} \sum_{i=-w/2}^{w/2} \sum_{j=-w/2}^{w/2} I_g^2(x+i, y+j)}$$

Wherein:
$f_x$ and $f_y$ are the output of a Sobel operator applied to pixels in each image;
x and y stand for the central pixel of a local texture sliding window;
i and j identify pixel displacement around the local texture sliding window's central pixel x, y;
w is the local texture sliding window's width and height.

32. The system of claim 31, wherein said processor is configured to obtain normalized differences in accordance with $$R = 1 - \frac{2 \times TEM_a \times TEM_b}{(TEM_{aa} + TEM_{bb})}; 0 \le R < 1$$

wherein:
$TEM_a$ is the local texture obtained for $Image_a$ amongst respective group;
$TEM_b$ is the local texture obtained for $image_b$ amongst said respective group;
$TEM_{aa}$ is $(TEM_a)^2$; and
$TEM_{bb}$ is $(TEM_b)^2$.

33. The system of claim 30, wherein said local targetness calculation is computed in accordance with $$T = \frac{\prod_{j=1}^{n} G_j}{\prod_{j=1}^{n} G_j + \prod_{j=1}^{n} \bar{G}_j};$$

wherein:
n is the number of pixels forming a targetness sliding window;
$G_j$ is the G value computed for a pixel j in accordance with:

$G=1-\exp(-f/k \times \mu_{loc})$ wherein:
f represents reflection of a pixel;
$\mu_{loc}$=mean(f), the mean reflection of pixels in an extended neighborhood of the pixel;
k is a constant.

34. The system of claim 33, wherein said processor is configured to obtain normalized differences in accordance with $T_{diff}=T_a \times (1-T_b)+T_b \times (1-T_a)$ wherein
$T_a$ and $T_b$ stand for T of corresponding pixels in $Image_a$ and $Image_b$, respectively.

35. The system of claim 20 wherein said group comprises two images.

36. The system of claim 20, wherein said images are SAR (Synthetic Aperture Radar) images.

37. The system of claim 20, wherein said plurality of registered images originate from more than one platform.

38. The system of claim 20 wherein the likelihood of discrepancy calculated between respective pixels related to an object in a common area of interest of several registered images is indicative of likelihood of absence of the object in at least one of the images in said group.

39. A method for computerized generation of an enhanced SAR (Synthetic Aperture Radar) image based on a plurality of SAR images, utilizing a processor, the method comprising:
   (a) receiving a plurality of registered SAR images, each comprising a common area of interest;
   (b) receiving processing parameters;
   (c) grouping, by said processor, said plurality of registered SAR images into one or more groups;
   (d) processing, by said processor, the SAR images within said one or more groups, wherein said processing comprises:

i) for each given pixel within the common area of interest, calculating a likelihood of discrepancy between respective pixels of the registered SAR images of said one or more groups, thus giving rise to likelihood of discrepancy characterizing said given pixel;

ii) generating a "likelihood of discrepancy matrix" comprising the likelihood of discrepancy values, characterizing the likelihood of discrepancy for each pixel within the common area of interest;

iii) for each of said one or more groups, generating an enhanced SAR image while utilizing said likelihood of discrepancy matrix.

40. The method of claim 39, wherein in case more than one enhanced image is generated the method further comprises:
   (a) grouping said enhanced SAR images into one or more groups;
   (b) processing the SAR images within said one or more groups, wherein said processing comprises:
      i) for each given pixel within the common area of interest, calculating a likelihood of discrepancy between respective pixels of the registered SAR images of said one or more groups, thus giving rise to likelihood of discrepancy values characterizing said given pixel;
      ii) generating a "likelihood of discrepancy matrix" comprising the likelihood of discrepancy values, characterizing the likelihood of discrepancy for each pixel within the common area of interest;
      iii) for each of said one or more groups, generating an enhanced SAR image while utilizing said likelihood of discrepancy matrix
   (c) repeating steps (a) and (b) until a single enhanced SAR image is created.

41. The method of claim 39, wherein in case any of said groups consists more than two SAR images, said generating a "likelihood of discrepancy matrix" for that group comprises:
   (a) generating a likelihood of discrepancy matrix for at least one possible couple within the group;
   (b) calculating an average likelihood of discrepancy matrix corresponding to all likelihood of discrepancy matrices generated for said at least one possible couple in the group.

42. The method of claim 39, wherein each pixel in said enhanced SAR image is calculated as a weighted combination between respective pixels of the SAR images in the group, wherein the weights of the respective pixels are defined by their respective values within the likelihood of discrepancy matrix.

43. The method of claim 42, further comprising selecting a SAR image to be enhanced, wherein the pixel corresponding to the selected SAR image is provided with additional weight in the weighted combination proportional to the likelihood of discrepancy value.

44. The method of claim 39, wherein said generating an enhanced SAR image comprises improving the contrast of at least one of said plurality of registered SAR images.

45. The method of claim 39, wherein said generating an enhanced SAR image comprises reducing noise in at least one of said plurality of registered SAR images.

46. The method of claim 39, wherein said processing parameters include at least one of the following:
   (a) an indication of a selected SAR image to be enhanced;
   (b) a target size parameter, representing the size of an object of interest;
   (c) a pixel size parameter, representing the size of an area covered by a single pixel in a SAR image.

47. The method of claim 39, wherein said generating a likelihood of discrepancy matrix includes:
   (a) computing one or more characteristics for each of said respective pixels of the SAR images of said one or more groups, thus giving rise to computed characteristics; and
   (b) processing said computed characteristics for obtaining normalized differences values amongst each of said respective pixels of the SAR images of said one or more groups, constituting the likelihood of discrepancy matrix respective of the one or more characteristics of each of said respective pixels of the SAR images of said one or more groups.

48. The method of claim 47, wherein said characteristics include at least one of the following:
   (a) local targetness calculations;
   (b) local texture calculation;
   (c) local entropy calculations.

49. The method of claim 48, wherein said local texture calculation is computed in accordance with $$I_g = \sqrt{f_x^2 + f_y^2}$$

$$TEM(x, y) = \sqrt{\frac{1}{w^2} \sum_{i=-w/2}^{w/2} \sum_{j=-w/2}^{w/2} I_g^2(x+i, y+j)}$$

Wherein:
$f_x$ and $f_y$ are the output of a Sobel operator applied to pixels in each SAR image;
x and y stand for the central pixel of a local texture sliding window;
i and j identify pixel displacement around the local texture sliding window's central pixel x, y;
w is the local texture sliding window's width and height.

50. The method of claim 49, wherein obtaining normalized differences is done in accordance with $$R = 1 - \frac{2 \times TEM_a \times TEM_b}{(TEM_{aa} + TEM_{bb})}; 0 \leq R < 1$$

wherein:
$TEM_a$ is the local texture obtained for $Image_a$, amongst respective group;
$TEM_b$ is the local texture obtained for $Image_b$ amongst said respective group;
$TEM_{aa}$ is $(TEM_a)^2$; and
$TEM_{bb}$ is $(TEM_b)^2$.

51. The method of claim 48, wherein said local targetness calculation is computed in accordance with $$T = \frac{\prod_{j=1}^{n} G_j}{\prod_{j=1}^{n} G_j + \prod_{j=1}^{n} \overline{G}_j};$$

wherein:
n is the number of pixels forming a targetness sliding window;
$G_j$ is the G value computed for a pixel j in accordance with:

$$G = 1 - \exp(-f/k \times \mu_{loc})$$

wherein:
f represents reflection of a pixel;
$\mu_{loc}$=mean(f), the mean reflection of pixels in an extended neighborhood of the pixel;
k is a constant.

52. The method of claim 51, wherein obtaining normalized differences is done in accordance with $$T_{diff} = T_a \times (1-T_b) + T_b \times (1-T_a)$$

wherein
$T_a$ and $T_b$ stand for T of corresponding pixels in Image$_a$ and Image$_b$, respectively.

53. The method of claim 39, wherein said group comprises two SAR images.

54. The method of claim 39, wherein said plurality of registered SAR images originate from more than one platform.

55. A computer program comprising computer program code means for performing all the steps of claim 39 when said program is run on a computer.

56. The method of claim 39 wherein the likelihood of discrepancy calculated between respective pixels related to an object in a common area of interest of several registered images is indicative of likelihood of absence of the object in at least one of the images in said group.

57. A system capable of generating an enhanced SAR (Synthetic Aperture Radar) image based on a plurality of SAR images, the system comprises a processor operatively connected to an image input block and a processing parameters input block;
   said image input block is configured to receive a plurality of registered SAR images, each comprising a common area of interest;
   said processing parameters input block is configured to receive processing parameters;
   said processor is configured to group said plurality of registered SAR images into one or more groups and process the SAR images within said one or more groups, including at least the following:
      i) for each given pixel within the common area of interest, calculate a likelihood of discrepancy between respective pixels of the registered SAR images of said one or more groups, thus giving rise to likelihood of discrepancy values characterizing said given pixel;
      ii) generate a "likelihood of discrepancy matrix" comprising the likelihood of discrepancy values, characterizing the likelihood of discrepancy for each pixel within the common area of interest;
      iii) for each of said one or more groups, generate an enhanced SAR image while utilizing said likelihood of discrepancy matrix.

58. The system of claim 57, wherein in case more than one enhanced SAR image is generated the processor is further configured to perform at least the following:
   (a) group said enhanced SAR images into one or more groups;
   (b) process the SAR images within said one or more groups, including at least the following:
      i) for each given pixel within the common area of interest, calculate a likelihood of discrepancy between respective pixels of the registered SAR images of said one or more groups, thus giving rise to likelihood of discrepancy values characterizing said given pixel;
      ii) generate a "likelihood of discrepancy matrix" comprising the likelihood of discrepancy values, characterizing the likelihood of discrepancy for each pixel within the common area of interest;
      iii) for each of said one or more groups, generate an enhanced SAR image while utilizing said likelihood of discrepancy matrix;
   (c) repeat steps (a) and (b) until a single enhanced SAR image is created.

59. The system of claim 57, further comprising a display wherein said processor is further configured to display said enhanced SAR image on said display.

60. The system of claim 57, wherein in case any of said groups consists more than two images, said generate a "likelihood of discrepancy matrix" for that group comprises:
   (a) generate a likelihood of discrepancy matrix for at least one possible couple within the group;
   (b) calculate an average likelihood of discrepancy matrix corresponding to all likelihood of discrepancy matrices generated for said at least one possible couple in the group.

61. The system of claim 57, wherein each pixel in said enhanced SAR image is calculated as a weighted combination between respective pixels of the SAR images in the group, wherein the weights of the respective pixels are defined by their respective values within the likelihood of discrepancy matrix.

62. The system of claim 61, wherein said processor is further configured to receive a selection of a SAR image to be enhanced, and wherein the pixel corresponding to the selected SAR image is provided with additional weight in the weighted combination.

63. The system of claim 57, wherein said processor is configured to perform an enhancement of the contrast of at least one of said plurality of registered SAR images during generation of an enhanced SAR image.

64. The system of claim 57, wherein said processing parameters include at least one of the following:
   (a) an indication of a selected SAR image to be enhanced;
   (b) a target size parameter, representing the size of an object of interest;
   (c) a pixel size parameter, representing the size of an area covered by a single pixel in a SAR image.

65. The system of claim 57, wherein said processor is configured to perform at least the following steps during said generation of a likelihood of discrepancy matrix:
   (a) compute one or more characteristics for each of said respective pixels of the SAR images of said one or more groups, thus giving rise to computed characteristics; and
   (b) process said computed characteristics to obtain normalized differences values amongst each of said respective pixels of the SAR images of said one or more groups, constituting the likelihood of discrepancy matrix respective of the one or more characteristics of each of said respective pixels of the SAR images of said one or more groups.

66. The system of claim 65, wherein said characteristics include at least one of the following:
   (a) local targetness calculations;
   (b) local texture calculation;
   (c) local entropy calculations.

67. The system of claim 66, wherein said processor is configured to perform local texture calculation in accordance with $$I_g = \sqrt{f_x^2 + f_y^2}$$

$$TEM(x, y) = \sqrt{\frac{1}{w^2} \sum_{i=-w/2}^{w/2} \sum_{j=-w/2}^{w/2} I_g^2(x+i, y+j)}$$

Wherein:
$f_x$ and $f_y$ are the output of a Sobel operator applied to pixels in each SAR image;
x and y stand for the central pixel of a local texture sliding window;
and j identify pixel displacement around the local texture sliding window's central pixel x, y;
w is the local texture sliding window's width and height.

68. The system of claim 67, wherein said processor is configured to obtain normalized differences in accordance with $$R = 1 - \frac{2 \times TEM_a \times TEM_b}{(TEM_{aa} + TEM_{bb})}; 0 \le R < 1$$

wherein:
$TEM_a$ is the local texture obtained for $Image_a$ amongst respective group;
$TEM_b$ is the local texture obtained for $Image_b$ amongst said respective group;
$TEM_{aa}$ is $(TEM_a)^2$; and
$TEM_{bb}$ is $(TEM_b)^2$.

69. System of claim 66, wherein said local targetness calculation is computed in accordance with $$T = \frac{\prod_{j=1}^{n} G_j}{\prod_{j=1}^{n} G_j + \prod_{j=1}^{n} \overline{G}_j};$$

wherein:
n is the number of pixels forming a targetness sliding window;
$G_j$ is the G value computed for a pixel j in accordance with:

$$G = 1 - \exp(-f/k \times \mu_{loc})$$

wherein:
f represents reflection of a pixel;
$\mu_{loc}$=mean(f), the mean reflection of pixels in an extended neighborhood of the pixel;
k is a constant.

70. The system of claim 69, wherein said processor is configured to obtain normalized differences in accordance with $$T_{diff} = T_a \times (1 - T_b) + T_b \times (1 - T_a)$$

wherein
$T_a$ and $T_b$ stand for T of corresponding pixels in $Image_a$ and $Image_b$, respectively.

71. The system of claim 57, wherein said group comprises two SAR images.

72. The system of claim 57, wherein said plurality of registered SAR images originate from more than one platform.

73. The system of claim 57 wherein the likelihood of discrepancy calculated between respective pixels related to an object in a common area of interest of several registered images is indicative of likelihood of absence of the object in at least one of the images in said group.

74. A method for computerized detection of objects in SAR (Synthetic Aperture Radar) images, utilizing a processor, the method comprising:
 (a) receiving a SAR image;
 (b) receiving processing parameters;
 (c) normalizing, by said processor, return values for each pixel within a sliding window;
 (d) operating, by said processor, a reinforcement operator on said normalized return values, wherein said operation enables strengthening high return values and weakening low return values, and wherein said normalized return values characterize the likelihood of existence of objects.

75. A computer program comprising computer program code means for performing all the steps of claim 74 when said program is run on a computer.

* * * * *